United States Patent [19]
Krutak et al.

[11] Patent Number: 5,030,708
[45] Date of Patent: Jul. 9, 1991

[54] COLORED POLYESTER COMPOSITIONS

[75] Inventors: James J. Krutak; William W. Parham; Clarence A. Coates, Jr.; Terry A. Oldfield; Wayne P. Pruett, all of Kingsport; Samuel D. Hilbert, Jonesborough; Max A. Weaver, Kingsport, all of Tenn.

[73] Assignee: Eastman Kodak Company, Rochester, N.Y.

[21] Appl. No.: 628,974

[22] Filed: Dec. 17, 1990

[51] Int. Cl.[5] .................... C08G 63/685; C08G 63/688

[52] U.S. Cl. .................................... 528/272; 528/289; 528/290; 528/291; 528/294; 528/295; 528/298; 528/308; 528/308.6; 528/377; 528/392; 528/403; 525/421; 525/425; 525/426; 525/427; 525/445

[58] Field of Search ............... 528/272, 289, 290, 291, 528/294, 295, 298, 308, 308.6, 377, 392, 403; 525/421, 425, 426, 427, 445

[56] References Cited

U.S. PATENT DOCUMENTS

| | | | |
|---|---|---|---|
| 3,666,747 | 5/1972 | Siegel et al. . | |
| 4,039,467 | 8/1977 | Tucker | 252/300 |
| 4,330,469 | 5/1982 | Gati et al. . | |
| 4,617,373 | 10/1986 | Pruett et al. | 528/288 |
| 4,617,374 | 10/1986 | Pruett et al. | 528/288 |
| 4,707,537 | 11/1987 | Pruett et al. | 528/288 |
| 4,740,581 | 4/1988 | Pruett et al. | 528/289 |
| 4,749,772 | 6/1988 | Weaver et al. | 528/288 |
| 4,749,773 | 6/1988 | Weaver et al. | 528/288 |
| 4,749,774 | 6/1988 | Weaver et al. | 528/288 |
| 4,791,188 | 12/1988 | Weaver et al. | 528/288 |
| 4,803,241 | 2/1989 | Weaver et al. | 524/719 |
| 4,826,903 | 5/1989 | Weaver et al. | 524/205 |
| 4,845,187 | 7/1989 | Weaver et al. | 528/288 |
| 4,845,188 | 7/1989 | Weaver et al. | 528/272 |
| 4,882,412 | 11/1989 | Weaver et al. | 528/190 |
| 4,892,922 | 1/1990 | Weaver et al. | 528/190 |
| 4,950,732 | 8/1990 | Weaver et al. | 528/288 |
| 4,958,043 | 9/1990 | Weaver et al. | 558/403 |

*Primary Examiner*—John Kight, III
*Assistant Examiner*—Sam A. Acquah
*Attorney, Agent, or Firm*—Bernard J. Graves, Jr.; William P. Heath, Jr.

[57] ABSTRACT

Provided are novel methine colorants derived from acetaldehyde, 1,3-dihydro-7-methoxycarbonyl-1,1,3-trimethyl-2H-benz[e]indol-2-ylidine and polyester compositions and concentrates having these colorants copolymerized therein. Also provided are novel intermediates useful for making the colorants.

40 Claims, No Drawings

COLORED POLYESTER COMPOSITIONS

FIELD OF THE INVENTION

This invention belongs to the field of polyester chemistry. More particularly, this invention relates to polyester compositions having certain methine colorants copolymerized therein.

BACKGROUND OF THE INVENTION

Copolymerization of yellow and red anthraquinone colorants into polyesters is known. See, for example, U.S. Pat. Nos. 4,267,306; 4,403,092; and 4,359,570. However, these colorants inherently have low molar extinction coefficients and are expensive. Also, U.S. Pat. No. 4,617,373 describes certain methine colorants having the formulae (A)

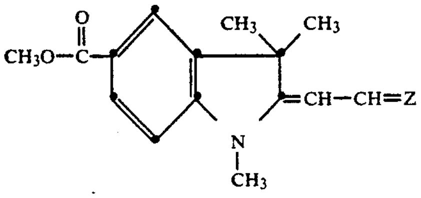

and (B)

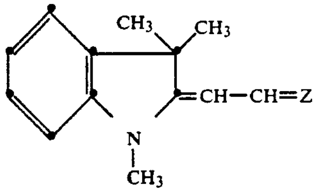

wherein Z is the residue of certain active methylene groups, and these colorants copolymerized within polyesters.

DETAILED DESCRIPTION OF THE INVENTION

Plastics, paints, printing inks, rubber, cosmetics, e.g., lipsticks, etc., are usually colored by organic colorants when superior brilliance and tinctorial strength are advantageous. Toxicity has been a chronic problem related to the use of these materials as some have been shown to be potential carcinogens and to cause contact dermatitis. (See, for example, Federal Register, (July 15, 1988) and ACTA Derm. VENEROL, Suppl. 1987, 134, pp. 95-97.) Recent publications document the continued concern. Plastics usually consist of large macromolecules and other ingredients such as fillers, plasticizers, colorants, etc. Most polymers do not produce allergic reactions by themselves, but leachable additives are known to cause contact dermatitis. (See, for example, S. Fregert, *Manual of Contact Dermatitis*, Munksgard, Denmark, 2nd Ed. 1981.)

The overall purpose of this invention is to provide colored polymeric compositions which have the colorants incorporated into the polymer chain so that the colorant will not be leachable, sublimable, extractable, or be exuded from the polymer composition. A further purpose is to provide microcrystalline polyester materials capable of being formulated into a wide variety of products such as cosmetics, household care products, etc., which will be safe to humans since exposure to toxic molecules readily absorbed by the body is greatly minimized. As can be envisioned, these polymeric compositions have utility in a wide variety of applications where toxicological concerns are evident. The concentrate materials may be used for imparting color to a wide variety of thermoplastic compositions including polyesters, polycarbonates, polyamides, cellulose esters, polyurethanes, polyolefins, etc., by conventional melt or solution blending techniques. When using the polymeric color concentrates of this invention, the colorant problems relative to toxicity concerns are overcome.

The present invention provides a polyester composition having copolymerized therein or reacted therewith at least 0.001 weight percent of a residue of Formulae (I) and/or (II):

(I)

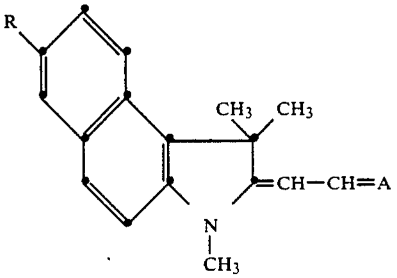

and/or (II)

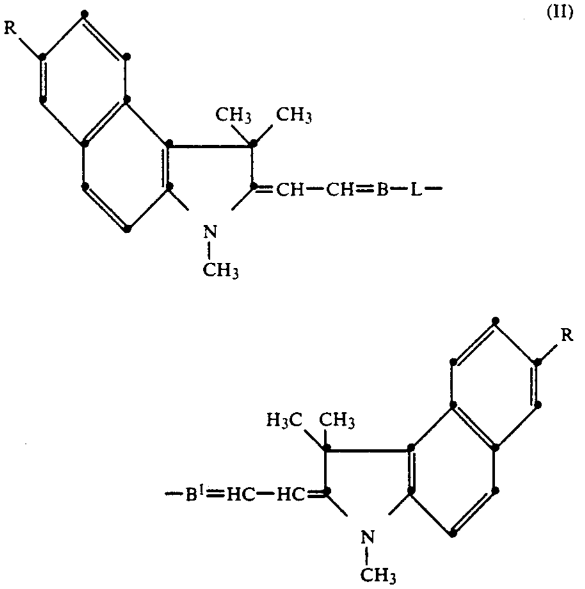

wherein R is carboxy, $C_1$–$C_8$ optionally substituted alkoxycarbonyl, $C_3$–$C_7$ cycloalkoxycarbonyl, $C_3$–$C_8$ alkenyloxycarbonyl or aryloxycarbonyl;

A is a divalent residue of an active methylene component;

B and $B^1$ are the trivalent residues of an active methylene compound; and

L is a $C_1$–$C_{20}$ divalent organic residue.

As a further aspect of the present invention, there are provided colorant compounds of Formulae (I) and (II).

Preferred thermally stable colorants are those of Formulae (I) and/or (II) wherein A represents the divalent residue of an active methylene compound selected from α-cyanoacetic acid esters, α-cyanoacetamides, α- arylacetonitriles, 2(5H)-furanones, 3-cyano-1,6.dihydro-4.methyl.2,6-dioxy(2H)-pyridines, 1,3-indandiones and benzo(b)thieno.3 (2H)-ylidenepropane-dinitrile-S, S-dioxide compounds; wherein B and $B_1$ each represent a trivalent residue of an active methylene compound selected from those classes listed above for A; wherein L is a divalent organic linking group; and wherein B—L—$B_1$ in combination can also be the residue of an arylene-diacetonitrile compound.

A further preferred group of compounds are those where A is selected from one of the following structures:

$=C(CN)CO_2R_1$, $=C(CN)CON(R_2)R_3$, $=C(CN)R_5$,

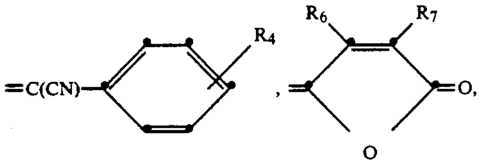

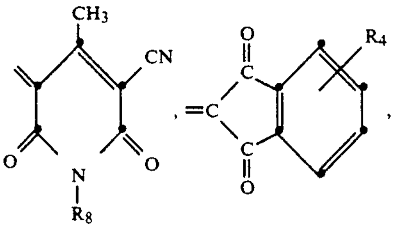

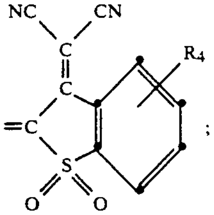

wherein $R_1$ is unsubstituted or substituted straight or branched chain alkyl of 1-8 carbons, unsubstituted or substituted cycloalkyl, unsubstituted or substituted aryl or alkenyl; wherein $R_2$ and $R_3$ are independently selected from hydrogen or one of the groups listed for $R_1$; $R_4$ is selected from hydrogen, lower alkyl, lower alkoxy, halogen, carboxy or lower alkoxycarbonyl; $R_5$ is an aromatic heterocyclic radical selected from unsubstituted or substituted 2-benzothiazolyl, 2benzoxazolyl, 2-benzimidazolyl, pyridyl, pyrimidinyl, 1,3,4-thiadiazol 2-yl, 1,2,4-thiadiazol-5-yl, 1,3,4-oxadiazol-2-yl, 2-thiazolyl, thienyl or furanyl; $R_6$ is selected from unsubstituted or substituted alkyl and aryl; R7 is cyano, $—SO_2R_1$, $—CO_2R_1$, $—CON(R_2)R_3$, unsubstituted or substituted phenyl, or $R_5$; and $R_8$ is hydrogen or one of the groups represented by $R_1$.

Particularly preferred are compounds of Formula (I) wherein $R_1$ is lower alkyl, $R_4$ is carboxy or carboxylate ester, $R_5$ is 5 -carboxy (or ester)-2-benzothiazolyl, 5-carboxy (or ester)-2.benzoxazolyl and 5-carboxy (or carboxy)-2-benzimidazolyl; $R_6$ is selected from phenyl or phenyl substituted with lower alkyl, lower alkoxy or halogen; $R_7$ is selected from $CO_2R_1$, wherein $R_1$ is lower alkyl; and $R_8$ is alkyl substituted with hydroxy or acyloxy and phenyl or benzyl substituted with carboxy or lower alkoxycarbonyl.

Also preferred are compounds of Formula (II) wherein the active methylene residues B and $B_1$ are independently selected from the following structures:

$=C(CN)CO_2—$, $=C(CN)CON(R_2)—$,

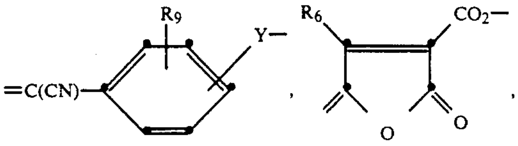

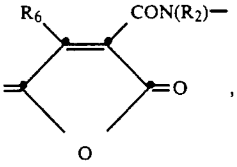

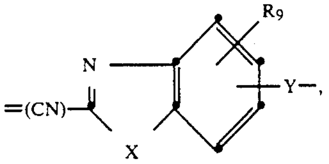

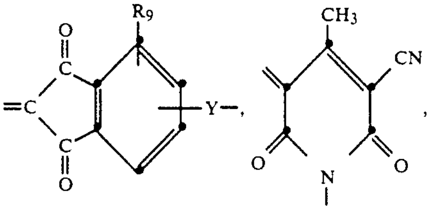

, or

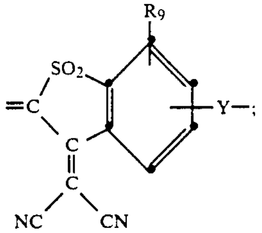

wherein $R_9$ is selected from hydrogen, lower alkyl, lower alkoxy, or halogen; X is selected form —O—, —S—or $—N(R_2)—$; Y is a divalent linking group selected from —O—, —S—, $SO_2$, $—OCO_2—$, $—CO_2$, $—CON(R_2)—$, $—SO_2N(R_2)—$ or $—N(SO_2R_1)—$; wherein $R_1$, $R_2$ and $R_6$ are as defined above in the definition of A; L is a divalent organic residue selected from unsubstituted or substituted lower alkylene, cycloalkylene, unsubstituted or substituted phenylene, unsubstituted or substituted alkylene-phenylene-alkylene, alkylene-cycloalkylene-alkylene-, alkylene-Y-alkylene, alkylene-Y-phenylene-, alkylene-Y-phenylene-alkylene, alkylene-Y-alkylene-Y-alkylene or alkylene-phenylene-alkylene-; Y is as defined above in the definition of B; and wherein $=B—L—B_1=$in combination has the structure $=C(CN)—C_6H_4—C(CN)=$.

Particularly preferred are compounds of Formula (II) wherein B and $B_1$ are selected from the following structures:

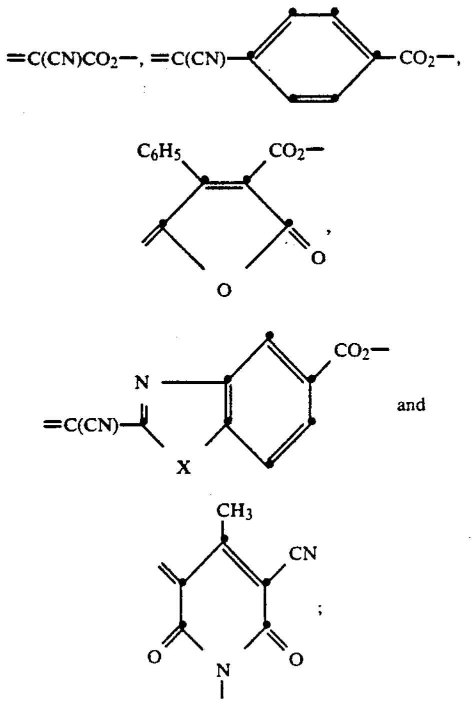

wherein X is as defined above and L is selected from alkylene, alkylene-0-alkylene, phenylene, alkylenecycloalkylene-alkylene or alkylene-arylene-alkylene.

Compounds of Formula (I) can be prepared as shown in the scheme below:

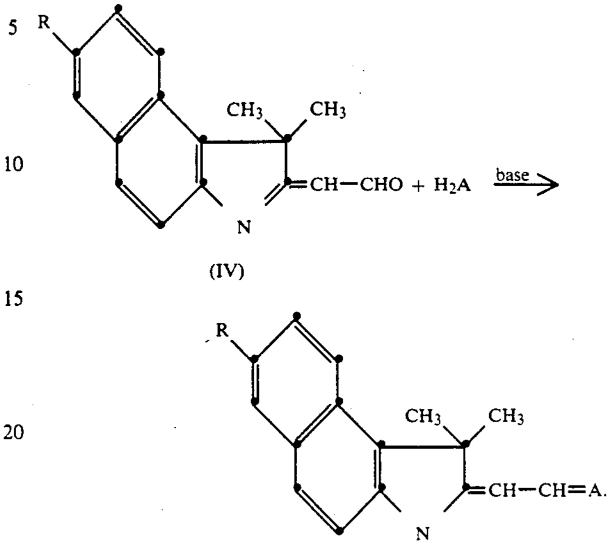

The intermediate aldehydes IV are reacted with the desired active methylene compounds using knoevenagel reaction conditions or in the presence of carboxylic anhydrides such as acetic anhydride.

Intermediate aldehydes (IV), where R=—$CO_2CH_3$, can be prepared as shown in the following scheme

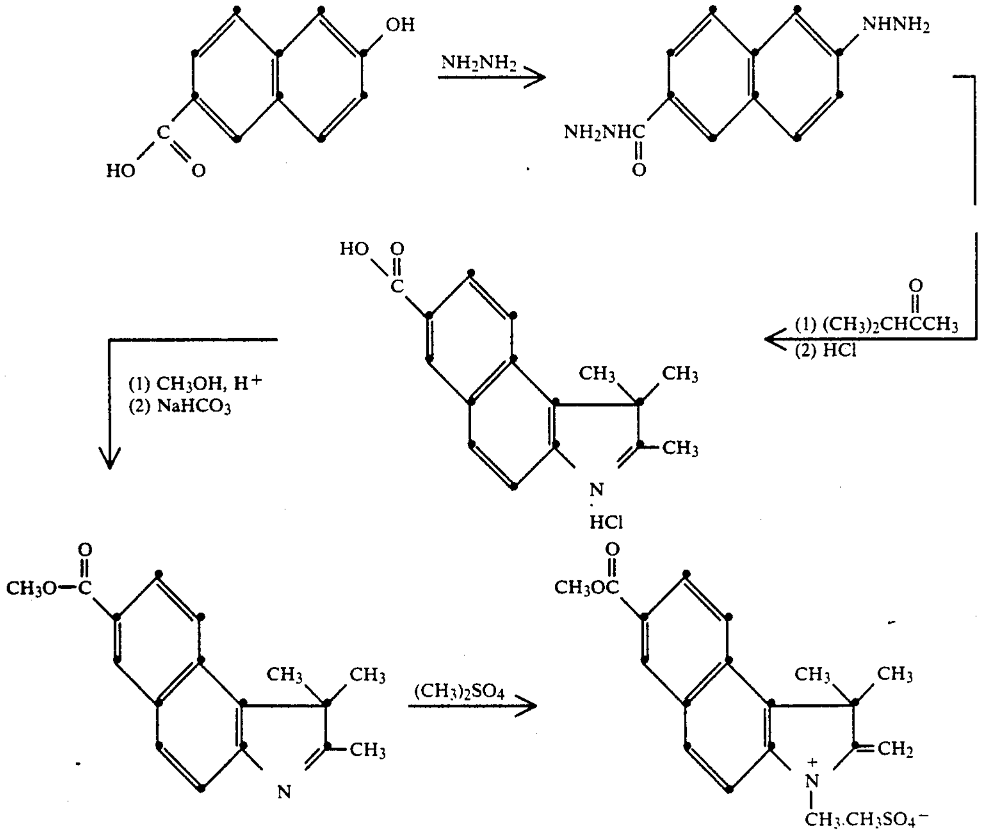

-continued

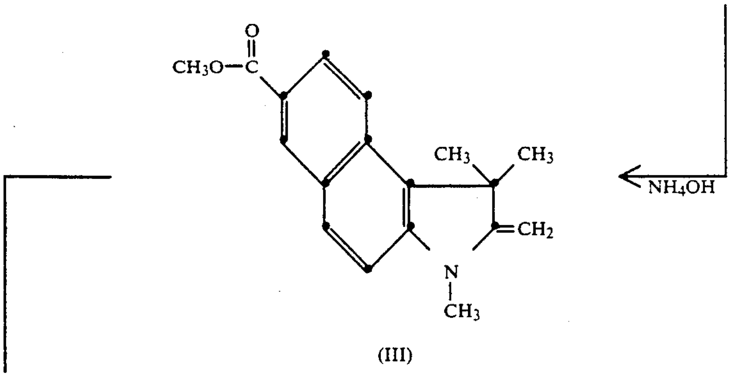

(III)

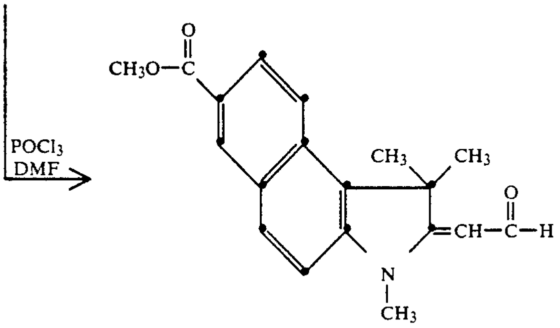

(IV)

As one of ordinary skill will appreciate, other esters in the 7-position can be introduced by using a different $C_1$–$C_8$ alcohol in the esterification step above. Further, standard hydrolysis of intermediate (IV) above provides the corresponding 7-carboxy compound.

As a further aspect of the present invention there are provided novel intermediates (III) and (IV) above, useful in preparing the compounds of the present invention.

Compounds of Formula (II) may be prepared by reacting two molar equivalents of intermediate (IV) with a compound of the formula $H_2B$—L—$B_1H_2$:

In contrast to the prior art, compounds of Formulae (I) and (II) of the present invention have unexpectedly high color yields (molar extinction coefficients) even with the carboxy or carboxylate ester group present in the residual aldehyde portion of the molecule. That is, the presence of the carboxy and carboxylate ester groups in (I) and (II) does not have an adverse effect on the color yield (see Table II) as noted above in the case of the prior art, e.g. compounds of Formulae A and B as set forth above, (see Table I, below).

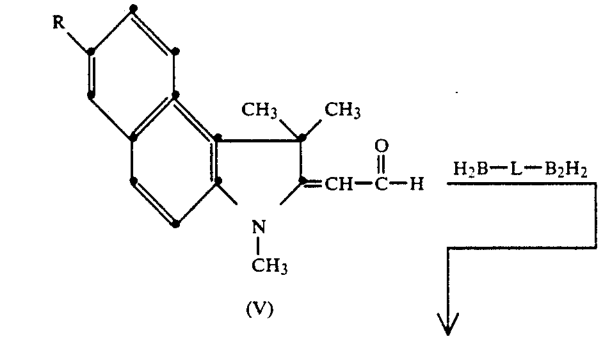

(V)

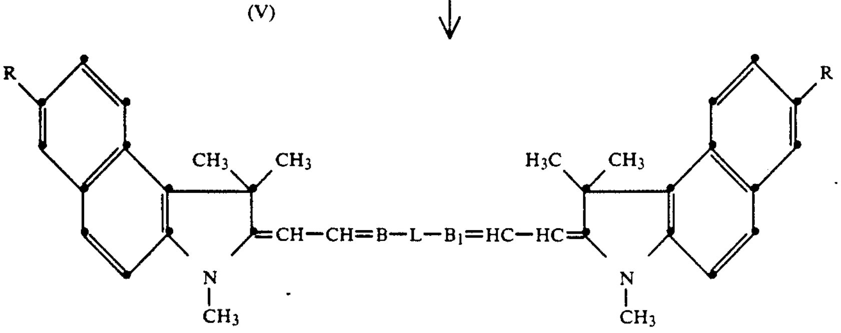

As a further aspect of the present invention, there is provided an amorphous color concentrate comprising an amorphous polyester having copolymerized therein or reacted therewith at least about 5.0 weight percent of a residue of Formula (I) and/or (II).

As a further aspect of the present invention, there is provided a partially-crystalline polyester color concentrate comprised of a partially-crystalline polyester having copolymerized therein or reacted therewith at least about 5.0 weight percent of a residue of Formula (I) and/or (II).

As a further aspect of the present invention, there is provided a colored semicrystalline powder having an average particle diameter of less than about 50 microns comprising a normally-amorphous polyester or a partially crystalline polyester which has been modified by dissolution-crystallization-precipitation to impart increased crystallinity thereto having copolymerized therein or reacted therewith at least about 5.0 weight percent of a residue of Formula (I) and/or (II).

The colored polyester compositions provided by this invention comprise extrusion, molding and fiber grade, thermoplastic, linear polyester having reacted therewith or copolymerized therein a compound of Formula (I) and/or (II). It is apparent that the amount of residue present in the polyester material will vary substantially depending on several factors such as the particular compound being used, for example, the tint or depth of shade desired, and the thickness of the article, e.g., film, bottle, etc., to be produced from the colored polyester composition. For example, relatively thin film and thin-walled containers require higher levels of the compounds of Formula (I) and/or (II) to produce an equivalent color than do thicker articles such as sheet material or tubing.

The polyesters which may be used in the preparation of the compositions of our invention include linear, thermoplastic, crystalline or amorphous polyesters produced by conventional polymerization techniques from one or more diols and one or more dicarboxylic acids. The polyesters normally have an inherent viscosity (IV) of about 0.4 to about 1.2. The preferred polyesters comprise at least about 50 mole percent terephthalic and/or 2,6-naphthalenedicarboxylic acid residues and at least about 50 mole percent ethylene glycol and/or 1,4-cyclohexanedimethanol residues. Particularly preferred polyesters are those containing from about 75 to 100 mole percent terephthalic and/or 2,6-naphthalenedicarboxylic acid residues and from about 75 to 100 mole percent ethylene glycol residues.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 2-methyl-1,3-propanediol, 1,6-hexanediol, 1,2-cyclohexanediol, 1,4-cyclohexanediol, 1,2.cyclohexanedimethanol, 1,3cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3cyclohexanedicarboxylic acid, succinic acid, glutaric acid, adipic acid, sebacic acid, 1,12-dodecanedioic acid, 2,6.naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The novel colored polyester compositions provided by this invention are useful in the manufacture of containers or packages for comestibles such as beverages and foods. By the use of known heat-setting techniques, certain of the polyesters are, in terms of color, I.V. and heat distortion, stable at temperatures up to about 100° C. Such stability characteristics are referred to as "hot-fill" stability. Articles molded from these polyesters exhibit good thin-wall rigidity, excellent clarity and good barrier properties with respect to moisture and atmospheric gases, particularly carbon dioxide and oxygen. The colored polyesters are particularly useful for the fabrication of containers having a wall thickness of about 10 to 30 mils. Further, the color concentrates of the present invention may be melt-blended with other colored or uncolored polyesters or blended with other polymers used in packaging materials. Thus, as a further aspect of the present invention, there is provided a formed article comprising the polyester composition as described above.

The linear polyesters most preferred for use in one embodiment of the invention comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate) and wherein the polyesters have been sufficiently heat set and oriented by methods well known in the art to give a desired degree of crystallinity. For the manufacture of blow-molded beverage bottles, the most preferred polyesters have an I.V. of 0.65 to 0.85, and a glass transition temperature (Tg) greater than 70° C. The glass transition temperature (Tg) referred to herein is determined by Differential Scanning Calorimetry at a scan rate of 20 Centigrade Degrees/minutes. The inherent viscosities (I.V., dl/g) of the polyesters described herein are determined at 25° C. using 0.5 g polymer per 100 mL of a solvent consisting of 60 parts by weight phenol and 40 parts by weight tetrachloroethane.

Colorants of Formula (I) and/or (II) are added at levels of about 1–5,000 ppm (parts by weight) before or during the polymerization reaction. For example, the colorants may be added along with the initial glycol and diacid (or ester) reactants, immediately prior to the polycondensation stage or subsequently. For this end use, the colorant compound of Formula (I) and/or (II) may contain one or a multiplicity of reactive groups, since addition of the copolymerizable colorants in relatively low levels does not interfere substantially with the polymer preparation even if chain termination or cross linking do occur.

Preferred groups which are reactive with at least one of the functional groups of the monomers from which the polyester is prepared, i.e., "polyester reactive groups", include hydroxy, carboxy, carbonyl halide, $C_1$–$C_{10}$ alkoxycarbonyl, $C_3$–$C_{10}$ alkenyloxycarbonyl, $C_3$–$C_8$ cycloalkoxycarbonyl, or a group of the formula $$-O\overset{O}{\overset{\|}{C}}R^{o},$$

wherein R° is hydrogen; $C_1$–$C_{10}$ alkyl; $C_1$–$C_{10}$ substituted alkyl; $C_3$–$C_8$ cycloalkyl; phenyl; substituted phenyl; furanyl, or thienyl.

The compounds of Formulae (I) and (II) and the reacted residues thereof possess the critical property of being sufficiently thermally stable to permit their copolymerization with polyesters by adding them at the start or at an early stage of the polyester preparation. Neither the colorant compounds nor their reacted residues sublime under polymerization conditions and the residues are not extractable from the polyesters. The thermal stability of the compounds of Formulae (I) and (II) is particularly important in the preparation of the color concentrates, i.e., polyesters containing from 1.0, especially at least 5.0, to as high as 50 weight percent of colorant residue. The color concentrates are advantageous in that the colorant moiety (1) is stable to heat and chemicals, (2) is resistant to sublimation, heat migration, bleeding and leaching by solvents, (3) possesses high color value or chroma and visible light absorption characteristics which allows the color concentrates to be combined with other color concentrates to provide a range of colors, (4) is safe to humans and the environment, and (5) may be blended with other polymers.

The colored semicrystalline powders provided by this invention may be derived from the color concentrates by means of a dissolution-crystallization-precipitation technique described in detail below. Various processes for the manufacture of finely-divided forms of polyesters have been disclosed in the prior art such as U.S. Pat. Nos. 4,378,228, 4,254,207, 3,586,654, 3,931,082, 4,267,310, 4,305,864, 4,451,606, 3,674,736 and 3,669,922. Some of these known processes include the presence of pigments such as carbon black during particle size reduction to produce colored polyester powders. The known procedures are summarized below.

1. Comminution, as by grinding, which is difficult and expensive and results in highly irregular-shaped particle having a broad range of particle size distribution.
2. Spray drying techniques which tend to produce "hollow shells" or porous particles and also are hazardous when organic solvents are used to dissolve the polyester.
3. Dispersion processes which involve melting the polymer in an inert solvent in the presence of a non-ionic dispersing agent. Polyester, in contrast to other thermoplastic polymers, tend to hydrolyze (decompose) when melted in the presence of water and the particles thus produced have a strong tendency to agglomerate or coalesce.
4. Heating under shearing agitation conditions a condensation polymer in an aprotic liquid which is not a solvent for the polymer and in the presence of a dispersing agent to form small liquid particles and cooling with agitation. Colorants added during this process are still extractable, sublimable, and may exude from the polymer.
5. Solvent induced crystallization wherein an amorphous polymer is initially contacted with a crystal-inducing fluid under certain conditions while the polymer is subjected to physical and/or ultrasonic forces. Colorants added during this process are not reacted with the polymer and therefore are subject to removal from the polymer.
6. Producing microcrystalline polyesters by a hydrolytic removal of amorphous regions of synthetic, linear polyesters followed by a mechanical disintegration of the resulting aggregated microcrystals.
7. Crystallization of polyesters in the presence of nucleating agents.

The prior art does not disclose the preparation of colored microcrystalline polyester powders wherein an amorphous or partially-crystalline polyester, having a thermally-stable, colorant compound of Formula (I) and/or (II) copolymerized therein, is converted to a colored, microcrystalline, polyester powder by means of a dissolution-crystallization-precipitation procedure. The prior art also fails to disclose microcrystalline, polyester powders containing high levels of colorant incorporated therein which cannot be removed by extraction or sublimation and which does not exude from the surface of the polymer.

The amorphous color concentrates of this invention exhibit a glass transition temperature (Tg) and no, or only a trace of, crystallization or melting point by differential scanning calorimetry (DSC). Examples of such amorphous polyesters include those obtained by the polymerization of a colorant compound of Formula (I), terephthalic and/or 2,6-naphthalenedicarboxylic acid and a branched-chain diol having the formula $$HO-CH_2-\underset{R^{21}}{\overset{R^{20}}{\overset{|}{\underset{|}{C}}}}-CH_2-OH$$

wherein $R^{20}$ is hydrogen or an unsubstituted or substituted alkyl, cycloalkyl or aryl radical, and $R^{21}$ is an unsubstituted or substituted alkyl, cycloalkyl or aryl radical. Preferred amorphous polyester color concentrates have an inherent viscosity of about 0.2 to 0.8 and are comprised of:

(i) diacid residues comprised of at least 50, preferably at least 80, mole percent terephthalic and/or 2,6-naphthalenedicarboxylic acid residues;

(ii) diol residues comprised of at least 50, preferably at least 80, mole percent of residues of a diol having the formula $$HO-CH_2-\underset{R^{21}}{\overset{R^{20}}{\overset{|}{\underset{|}{C}}}}-CH_2-OH$$

wherein $R^{20}$ is hydrogen or lower alkyl and $R^{21}$ is lower alkyl; and (iii) residues of a colorant compound of Formula (I) and/or (II).

The particularly preferred amorphous polyester color concentrates are comprised of (i) diacid residues consisting essentially of terephthalic and/or 2,6-naphthalenedicarboxylic acid residues; (ii) diol residues consisting essentially of 2,2-dimethyl-1,3propanediol residues; and (iii) residues of a colorant compound of Formula (I) and/or (II).

Other amorphous polyesters, as defined above, suitable for preparing the colored semicrystalline powders may be obtained by employing (1) two dicarboxylic acids and one or more diols or (2) two diols and one or more dicarboxylic acids according to known procedures for obtaining amorphous polyesters. The polyester comprising a diacid component consisting of 75 mole percent terephthalic acid residues and 25 mole percent 1,4-cyclohexanedicarboxylic acid residues, a diol component consisting of 1,4-butanediol residues and residues of a compound of Formula (I) and/or (II) is an example of such a polyester.

The partially-crystalline color concentrates of this invention usually exhibit a glass transition temperature, a crystallization temperature and a melting temperature by DSC. These partially-crystalline, polyester concentrates are comprised of (i) diacid residues consisting of at least 80 mole percent terephthalic acid residues, 2,6-naphthalenedicarboxylic acid residues, 1,3-cyclohexanedicarboxylic acid residues, 1,4-cyclohexanedicarboxylic acid residues or a mixture thereof, (ii) diol residues consisting of at least 50 mole percent of residues having the formula $—O—(CH_2)_p—O—$ wherein wherein p is 2, preferably 4, to 12 and (iii) residues of colorant compound (I) and/or (II). A preferred partially-crystalline color concentrate has a melting temperature of at least 110° C. and is comprised of (i) diacid residues comprised of at least 80 mole percent terephthalic acid residues, (ii) diol residues comprised of at least 80 mole percent of residues of 1,4-butanediol and (iii) residues of a colorant compound of Formula (I) and/or (II). An especially preferred partially-crystalline color concentrate has a melting temperature of at least 110° C. and consists essentially of (i) terephthalic acid residues, (ii) 1,4-butanediol residues and (iii) a colorant compound of Formula (I) and/or (II).

The colored semicrystalline powders provided by this invention may be obtained by means of a dissolution-crystallization-precipitation procedure wherein the amorphous or partially-crystalline polyester color concentrates described above are dissolved in an organic solvent from which the polymeric color concentrate is recovered in a finely divided form consisting of particles of relatively uniform size, e.g., from about 10 to 50 microns. If desired, the particle size of the colored semicrystalline powders may be reduced further by conventional grinding processes. Examples of solvents in which the amorphous and/or partially-crystalline concentrates may be dissolved include halogenated hydrocarbons such as aliphatic chlorides, e.g., methylene chloride; esters such as alkyl esters of carboxylic acids, e.g., ethyl acetate and methyl benzoate; hydrocarbons such as toluene; and ethers such as tetrahydrofuran. We have found methylene chloride to be a particularly effective solvent.

The particular dissolution-crystallization-precipitation procedure utilized is not critical. The amorphous or partially-crystalline concentrate may be dissolved in a suitable solvent at elevated temperatures and then crystallized in a finely-divided state by cooling, with or without a reduction in the volume of solvent, i.e., either with or without a solution concentration step. Another useful technique involves dissolving the amorphous concentrate in an organic solvent, either at ambient or elevated temperature, and then adding to the solution another miscible solvent which causes crystallization of the colored semicrystalline powder. The use of methylene chloride as the primary solvent and an alkyl acetate such as ethyl acetate as the "crystallization-inducing" solvent has been found to be particularly efficacious. Depending on their intended utility, the colored semicrystalline powders may be extracted with a suitable organic solvent to remove relatively low molecular weight polyester oligomers. Examples of oligomer-extracting solvents include ketones such as acetone, 2-pentanone, 3-methyl-2-butanone, 4-methyl-2-pentanone, 2.hexanone and 5-methyl-2-hexanone; hydrocarbons such as hexane, heptane and toluene; and ethers such as tetrahydrofuran. Another, but not preferred, dissolution-precipitation procedure involves dissolving the amorphous color concentrates in certain solvents, e.g., ethyl acetate, from which the polymeric color concentrate, after undergoing a change in morphology, precipitates.

Some of the more crystalline polyesters such as poly(ethylene terephthalate) and poly(tetramethylene terephthalate) require the use of a high-boiling solvent in the dissolution-precipitation procedure. Examples of such high-boiling solvents include alkyl esters of aromatic carboxylic acids, e.g., alkyl benzoates, and alkyl phthalates; aliphatic dicarboxylic acid esters; glycol esters, e.g., ethylene glycol diacetate; diethylene glycol diacetate; aromatic ketones, e.g., acetophenone, and aromatic oxides, e.g., diphenyl oxide; and aliphatic carboxamides, e.g., N,N-dimethylformamide and isophorone. Methyl benzoate and ethylene glycol diacetate are particularly preferred high-boiling solvents since they are readily available, have a pleasant odor and do not cause color problems during crystallization which sometimes is a problem with acetophenone.

In one variation of the process, crude polyester color concentrate is prepared and granulated to a very course powder which is heated with a high-boiling solvent (methyl benzoate) to facilitate solution. Upon cooling, crystallization-precipitation occurs and a diluent such as acetone usually is needed to permit stirring. Filtration gives the finely-divided powder which may require washing or reslurrying to remove the crystallization solvent.

In another variation of the dissolution-crystallization-precipitation process, crystallization can occur as an integral part of the polyester color concentrate manufacturing process wherein the crystallization solvent is added to a melt of the concentrate to obtain a solution of the color concentrate which then may be obtained as a powder by precipitation. The polyester color concentrate powder is thus obtained in a purified form without the need of granulating by a means which may be used in conjunction with batch processing.

The dissolution-crystallization-precipitation procedure alters the morphology of the amorphous and partially-crystalline polyester color concentrates in a number of respects. X-Ray diffraction analysis of the colored semicrystalline powders shows a marked increase in the crystallinity of the polyester and, while the amorphous polyester concentrates do not exhibit a melting temperature, the microcrystalline concentrates usually (almost always) exhibit a melting temperature by DSC. Although the weight average molecular weight (Mw) may increase, decrease or not be changed by the dissolution-crystallization-precipitation procedure, the number average molecular weight (Mn) always increases, the magnitude of the increase depending on the degree to which oligomeric material has been removed from the colored semicrystalline polyester powder. The polydispersity ratio (Mw:Mn) of the colored semicrystalline polyester is always less than that of the polyester concentrate from which it is prepared due to the increase in Mn (even when Mw increases, Mn increases more). Finally, the inherent viscosity of the colored semicrystalline powders normally is slightly higher than that of the color concentrate.

The amorphous and partially-crystalline polyester color concentrates may be used in coloring various thermoplastic polymeric materials when nonextractability or non-volatility of the colorant is critical because of toxicity considerations, e.g., in rigid and flexible packaging materials for food. The concentrates and powders may be used in formulating inks, coatings, toners for impactless printing, and similar products.

The polyester color concentrates may be prepared according to conventional esterification or transesterification and melt polycondensation procedures using (i) a dicarboxylic acid or, preferably, a lower alkyl ester thereof, (ii) a diol and (iii) a compound of Formula (I) and/or (II) bearing one to four, preferably about two, polyester reactive groups. Normally, at a 50 mole percent excess of the diol is used. The colorant compound of Formula (I) and/or (II) preferably is added with the other monomers at the commencement of the color concentrate manufacture although it may be added subsequently, e.g., at the beginning or during the polycondensation step. The concentration (weight percent) of the colorant residue is determined by summing up the weights of all the components charged to the reactor and subtracting the sum of the weights of the components removed during transesterification and polycondensation, e.g., methanol and excess diol. The difference represents the theoretical yield of the color concentrate. The weight of the colorant of Formula (I) and/or (II) charged to the reactor is divided by the theoretical weight and multiplied by 100 to give the weight percent of colorant residue.

The novel color concentrates and their preparation are further illustrated by the experimental section below. The inherent viscosities specified herein are determined at 25° C. using 0.5 g of polymer (polyester color concentrate) per 100 mL of a solvent consisting of 60 weight percent phenol and 40 weight percent tetrachloroethane. The weight average molecular weight (Mw) and number average molecular weight value referred to herein are determined by gel permeation chromatography. The melting temperatures are determined by differential scanning calorimetry on the first and/or second heating cycle at a scanning rate of 20° C. per minute and are reported as the peaks of the transitions.

The color concentrates provided by this invention comprise a polyester composition having copolymerized therein at least 0.5 wt %, based on the weight of the polyester, or more of the residue of one or more of colorants of Formula (I) and/or (II) wherein the initial colorant contains about two polyester reactive groups. Normally, the color concentrates will not contain greater than about 30 wt % of colorant residue, with a concentration in the range of about 5 to 20 wt % being preferred.

The term "substituted phenyl" as used herein refers to a phenyl group substituted with one or two groups chosen from the group consisting of halogen, hydroxy, cyano, nitro, $C_1$–$C_6$ alkyl, $C_1$–$C_4$ alkoxy, carboxy, carboxymethyl, hydroxymethyl, amino, trihalo methyl and N-methylsulfonylamino.

Examples of the term "substituted phenyl" include a mono- or di(halo)phenyl group such as 4-chlorophenyl, 2,6-dichlorophenyl, 2,5-dichlorophenyl, 3,4-dichlorophenyl, 3-chlorophenyl, 3-bromophenyl, 4-bromophenyl, 3,4-dibromophenyl, 3-chloro-4-fluorophenyl, 2-fluorophenyl and the like; a mono- or di(hydroxy)phenyl group such as 4-hydroxyphenyl, 3-hydroxyphenyl, 2,4-dihydroxyphenyl, and the like; a nitrophenyl group such as 3- or 4-nitrophenyl; a cyanophenyl group, for example, 4-cyanophenyl; a mono- or di(lower alkyl)phenyl group such as 4-methylphenyl, 2,4-dimethylphenyl, 2-methylphenyl, 4-(isopropyl)phenyl, 4ethylphenyl, 3-(n-propyl)phenyl and the like; a mono- or di(alkoxy)phenyl group, for example, 2,6-dimethoxyphenyl, 4-methoxyphenyl, 3-ethoxyphenyl, 4-(isopropoxy)phenyl, 4-(t-butoxy)phenyl, 3-ethoxy-4-methoxyphenyl and the like; 3- or 4-trifluoromethylphenyl; a nono- or dicarboxyphenyl group such as 4-carboxyphenyl or a mono- or di(hydroxymethyl)phenyl such as 3-(hydroxymethyl)phenyl or 3,4-di(hydroxymethyl)phenyl; a mono- or di(aminomethyl)phenyl such as 2-(aminomethyl)phenyl or 2,4(aminomethyl)phenyl; or a mono- or di(N-(methylsulfonylamino))phenyl such as 3-(N-(methylsulfonylamino))phenyl. Also, the term "substituted phenyl" represents disubstituted phenyl groups wherein the substituents are different, for example, 3-methyl-4-hydroxyphenyl, 3-chloro-4-hydroxyphenyl, 2-methoxy 4-bromophenyl, 4-ethyl-2-hydroxyphenyl, 3-hydroxy-4-nitrophenyl, 2-hydroxy-4-chlorophenyl and the like.

The term "substituted alkyl" refers to an alkyl group substituted by one or more halogen, phenyl, hydroxy, amino, $C_1$–$C_6$ alkoxycarbonyl, nitro, carboxy, 1 cyclohexyl, carbamoyl, cyano, $C_1$–$C_6$ alkylsulfonylamino or $C_1$–$C_6$ alkoxy groups. The substituted alkyl groups may be substituted one or more times with the same or with different substituents. Preferably, the alkyl portion contains from one to ten carbon atoms, most preferably from one to six carbon atoms.

Examples of the above substituted alkyl groups include cyanomethyl, nitromethyl, hydroxymethyl, trityloxymethyl, propionyloxymethyl, aminomethyl, carboxymethyl, allyloxycarbonylmethyl, allyloxycarbonylaminomethyl, carbamoyloxymethyl, methoxymethyl, ethoxymethyl, t-butoxymethyl, acetoxymethyl, chloromethyl, bromomethyl, iodomethyl, 6-hydroxyhexyl, 2,4-dichloro(n-butyl), 2-amino(iso-propyl), 2-carbamoyloxyethyl chloroethyl, bromoethyl, fluoroethyl, iodoethyl, chloropropyl, bromopropyl, fluoropropyl, iodopropyl, and the like.

The term "aryl" as used herein refers to heterocyclic aryl rings and carbocyclic rings. For example, aryl can be phenyl, naphthyl, phenanthryl, and the like. Aryl can also be 5 or 6-membered heterocyclic aryl rings containing one oxygen atom, and/or one sulfur atom, and up to three nitrogen atoms, said heterocyclic aryl ring optionally fused to one or two phenyl rings. Examples of such ring systems include thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo 1,5-b]pyridazinyl and purinyl, benzoxazolyl, benzthiazolyl, benzimidazolyl, indolyl and the like.

Accordingly, the term "substituted aryl" refers to such aryl rings substituted by one or more halogen, phenyl, hydroxy, amino, $C_1$–$C_6$ alkoxycarbonyl, nitro, carboxy, cyclohexyl, carbamoy, cyano, $C_1$–$C_6$ alkylsulfonylamino or $C_1$–$C_6$ alkoxy groups.

The term $C_1$–$C_8$ alkoxycarbonyl refers to a $C_1$–$C_8$ alkoxy group bonded to a carbonyl function. In other words, the $C_2$ alkoxycarbonyl group is ethoxycarbonyl. The term $C_1$–$C_8$ optionally substituted alkoxycarbonyl refers to a $C_1$–$C_8$ alkoxycarbonyl group optionally substituted by one or more halogen, phenyl, hydroxy, amino, $C_1$–$C_6$ alkoxycarbonyl, nitro, carboxy, cyclohexyl, carbamoyl, cyano, alkylsulfonylamino, or $C_1$–$C_6$ alkoxy groups.

The term "alkyl" as used herein preferably refers to a $C_1$–$C_{10}$ straight or branched chain alkyl group. The term "lower alkyl", preferably refers to a $C_1$–$C_6$ straight or branched-chain alkyl group.

The term $C_1$–$C_{20}$ divalent organic residue" (L) denotes typical organic linking groups bonded to the adjacent atoms through non-oxo carbon atoms. Thus, the $C_1$–$C_{20}$ linking group may be selected from a wide variety of alkylene, alkenylene, alkynylene, cycloalkylene, carbocyclic and heterocyclic arylene and combinations of such divalent groups. The alkylene linking groups may contain within their main chain hetero atoms, e.g., oxygen, sulfur, sulfonyl, nitrogen, substituted nitrogen, and/or cyclic groups such as cycloalkylene, carbocyclic arylene, or divalent aryl groups.

EXPERIMENTAL SECTION

Example 1

Preparation of Acetaldehyde, 1,3-dihydro7-methoxycarbonyl-1,1,3-trimethyl-2H-benz[e]indol-2-ylidene From 6-Hydroxy-2-naphthoic acid (a) Step 1—6-Hydroxy-2-naphthoic acid (128.0 g, 0.68 m) was added to 95% hydrazine (128.0 g) with cooling, keeping the temperature below about 50° C. The mixture was then heated at 125°–130° C. for 24 hours, cooled slightly and then drowned into iso-propyl alcohol to give the solid product, which was collected by filtration and washed with isopropyl alcohol.

(b) Step 2—The product from Step 1 (isopropyl alcohol wet) was added to acetic acid (400 mL) and dissolved by stirring. 3-Methyl-2-butanone (400mL) was added and the mixture stirred overnight at room temperature and then heated to boiling, removing about 300 mL of low boilers by distillation during the heating period. Concentrated HCL (200 mL) was added to acidify the reaction mixture and refluxing continued for about 8 hours to hydrolyze the hydrazide. The reaction mixture was cooled and the solid product collected by filtration, washed with isopropyl alcohol and dried in air. A yield (82.1% of the theoretical) of 161.0 g of 1,1,2-trimethyl-lH-benz[e]indole-7-carboxylic acid.HCL was obtained.

(c) Step 3—A portion of the product from Step 2 (115.6 g, 0.40 m), methanol (1.5 L) and conc. $H_2SO_4$ (10 mL) were heated at reflux for 4 hours. Some unesterified carboxylic acid still remained and was insoluble. Additional methanol (0.5 L) and conc. $H_2SO_4$ (5 mL) was added and refluxing continued for 8 hours. After allowing to cool, the solution was basified to a pH of about 8 by the addition of saturated aqueous sodium bicarbonate solution. Water (1.5 L) was added with stirring to precipitate the product which was collected by filtration, washed with water and dried in air. The yield of the methyl ester was 63.5 g (60.0% of the theoretical yield).

(d) Step 4—The product of Step 3 (63.5 g, 0.238 m) was dissolved in dry toluene (500 mL) by heating on a steam bath. Dimethyl sulfate (37.8 g, 0.3 m) was added at about 70° C. and then the reaction mixture stirred for about 2 hours, and then allowed to cool to room temperature. The product was collected by filtration, washed with diethyl ether and then dried in a vacuum desiccator. The yield of the quaternary salt was 77.0 g (83.0% of the theoretical yield).

(e) Step 5—A portion of the product from Step 4 (39.0 g, 0.10 m) was dissolved in water (400 mL). Ice was added for internal cooling and the pH increased to about 9 by addition of conc. ammonium hydroxide. The solid product (methyl 1,3-dihydro-2-methylene-1, 1,3-trimethyl-2H-benz[e]indole-7carboxylate) was collected by filtration, washed with water and dried in air. A yield of 26.7 g (95% of the theoretical yield) was obtained.

(f) Step 6—A portion of the product from Step 5 (26.0 g, 0.093 m) was dissolved in N,N-dimethylformamide (80 mL) and phosphorous oxychloride (10 mL) added dropwise at about 5°–15° C. After being heated for 1 hour at about 85° C., the reaction mixture was drowned into 800 g of water-ice mixture with stirring. The product was a viscous semi-solid which was washed with water by decantation. Methanol was added and a smooth slurry produced by good stirring. This mixture was then drowned into ice-water mixture and the resulting brown solid was dried in air and then finally crystallized from methanol in presence of charcoal to give 10.0 g of pure product which is light yellow in color. By elemental analysis and mass spectrometry the product was shown to be 1,3-dihydro-7-methoxy-carbonyl-1, 1,3-trimethyl-2H-benz[e]indole.2ylideneacetaldehyde (Compound V, R=$CO_2CH_3$), which melts at 220°–221.5° C.

Example 2

Preparation of 1H-Benz[e]indole-7carboxylic acid, 2,3-dihydro.2-[[4(methoxycarbonyl)-5-oxo-3-phenyl-2-(5H)-furanylidene]ethylidene]-1, 1,3-trimethyl-, methyl ester A mixture of 1,3-dihydro-7-methoxycarbonyl-1,1,3-trimethyl-2H-benz[e]indole-2-ylideneacetaldehyde (6.18 g, 0.02 m), methyl 4-phenyl-2(5H)-furanone-3-carboxylate (4.36 g, 0.02 m) and acetic anhydride (50 mL) was heated at 90°–95° C. for 1.5 hours and then allowed to cool. Diethyl ether (500 mL) was added with stirring and the red product collected by filtration, washed with diethyl ether and dried in air. The yield was 5.80 g (50.0% of the theoretical yield) of product having the following structure as evidenced by mass spectrum analysis:

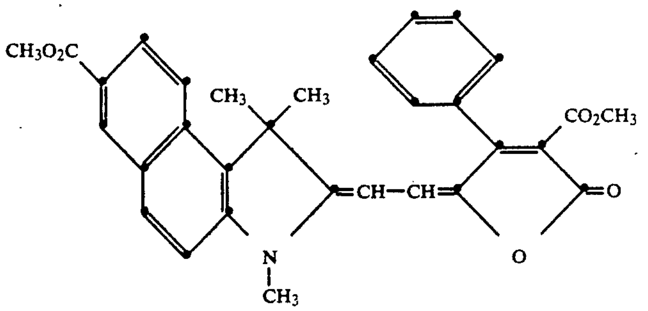

λ max - 558 nm ($CH_2Cl_2$);
ε - 69,032

The magenta colorant has a visible absorption maximum (λ max) at 558 nm (ε=69,032) in methylene chloride.

Example 3

Preparation of 1H-Benz[e]indole-7-carboxylic acid, 2-(3-cyano-4-methoxy 4 oxo-2-butenylidene)-2,3-dihydro-1,1,3trimethyl-, methyl ester

A mixture of 1,3-dihydro-7-methoxycarbonyl-1,1,3 -trimethyl-2H-benz[e]indole-2-ylideneacetaldehyde (3.09 g, 0.01 m) methyl cyanoacetate (1.0 g, 0.01 m) and acetic anhydride (15 mL was heated at about 95° C. and then allowed to cool. The yellow product was collected by filtration, washed with diethyl ether and dried in air (yield-3.1 g, 79.5% of the theoretical yield). Mass spectrum analysis supports the following structure:

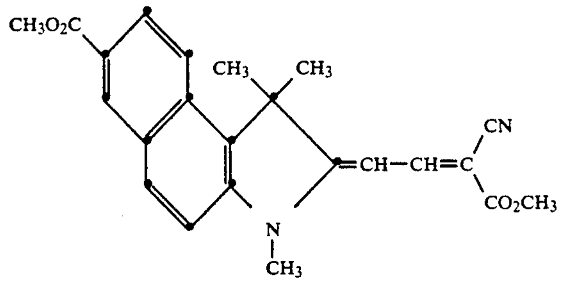

λ max - 457 nm ($CH_2Cl_2$);
ε - 72,631

In the visible absorption spectrum in methylene chloride an absorption maximum is observed at 457 nm (ε=72,631).

Example 4

Preparation of 1H-Benz[e]indole-7-carboxylic acid, 2-[[5-cyano-1,6-dihydro-1-(2-hydroxyethyl)-4-methyl-2, 6-dioxo-3(2H)-pyridinylidene]-ethylidene]-2, 3-dihydro-1,1,3-trimethyl-, methyl ester

A mixture of 1,3-dihydro-7-methoxycarbonyl-1,1,3-trimethyl-2H-benz[e]indole-2-ylideneacetaldehyde (4.64 g, 0.015 m), 3-cyano-6-hydroxy-1-(2-hydroxyethyl)-4-methyl-2-pyridone (2.91 g, 0.015 m) and acetic anhydride (30.0 mL) was heated at about 95° C. for 2 hours. Diethyl ether (100 mL) was added to the cooled reaction mixture with stirring. The magenta product was collected by filtration, washed with ether and dried in air. A yield of 6.8 g (93.1% of the theoretical yield) of product having mostly the following structure as evidenced by mass spectrometry is obtained:

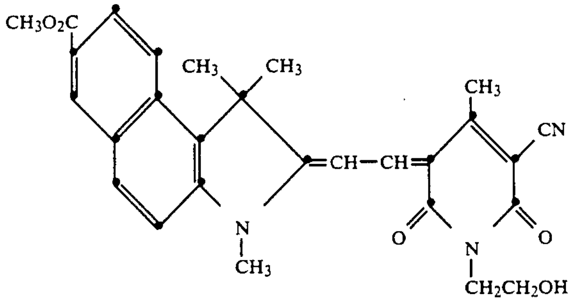

λ max - 545 nm ($CH_2Cl_2$);
ε - 117,426

Also present was a significant quantity of the acetylated product. For determining the extinction coefficient and when using as a copolymerizable monomer, the molecular weight of the free hydroxy (unacetylated) compound was used. The visible absorption spectrum has an absorption maximum (λ max) at 545 nm (ε=117, 426) in methylene chloride.

Example 5

A mixture of 1,3-dihydro-7-methoxycarbonyl-1,1,3-trimethyl-2H-benz[e]indole-2-ylideneacetaldehyde (1.55 g, 0.005 m), 1,3-indandione (0.73 g, 0.005 m) and acetic anhydride (12 g) was stirred for one hour at room temperature and then heated at 90°-95° C. for about 1 hour, followed by stirring overnight at room temperature. The reaction mixture was diluted with diethyl ether and the red colorant collected by filtration, washed with diethyl ether and dried in air. The yield was 1.8 g (82.3% of the theoretical yield) of product having an absorption maximum (λ max) at 512 nm (εmax=124,851) in methylene chloride and which has the following proposed structure as evidenced by mass spectrometry:

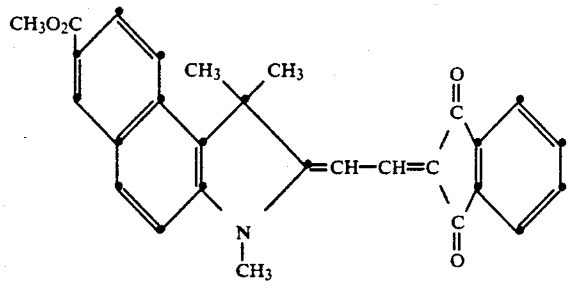

λ max - 512 nm ($CH_2Cl_2$);
ε = 124,851

Example 6

A mixture of 1,3-dihydro-7-methoxycarbonyl-1,1,3-trimethyl-2H-benz[e]indole-2-ylideneacetaldehyde (1.55 g, 0.005 m), 6-chloro-benzo(b)thieno-3-(2H)-ylidene-propanedinitrile-S,S-dioxide (1.32 g, 0.005 m) and acetic anhydride (20 g) was heated and stirred at 90°-95° C. for 1 hour and then stirring continued overnight at room temperature. The reaction mixture was then diluted with diethyl ether (20 mL) and the blue product collected by filtration, washed with isopropanol and dried in air (yield-2.61 g, 93.5% of the theoretical yield). After recrystallization from boiling pyridine (25 mL), cooling, filtering, washing with ethanol and drying in air, the purified product was obtained (2.21 g), which has an absorption maximum (λ max) at 621 nm εmax=81,580) and has the following proposed structure as evidenced by mass spectrometry:

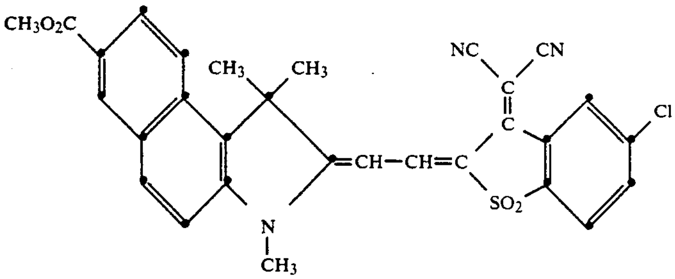

λ max - 621 nm ($CH_2Cl_2$);
ε = 81,580

Example 7

A mixture of 1,3-dihydro-7-methoxycarbonyl-1,1,3-trimethyl-2H-benz[e]indole-2-ylideneacetaldehyde (1.55 g, 0.005 m), ethylene bis-cyanoacetate (0.49 g, 0.0025 m) and acetic anhydride (20 mL) was heated and stirred at 90°-95° C. for 4 hours and allowed to stand overnight at room temperature, whereupon some of the yellow product crystallized. The entire reaction mixture was drowned into water and allowed to stand several hours with occasional stirring. The bis-methine product was collected by filtration, washed with water, then washed with methanol and dried in air. A yield of 1.4 g of product was obtained which by mass spectrometry has the following structure:

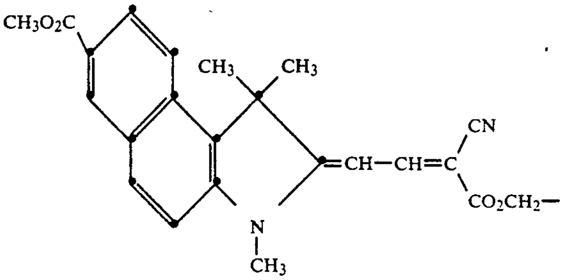

λ max - 460 nm ($CH_2Cl_2$);
ε = 101,748

An absorption maximum (λ max) is observed at 460 nm in the visible absorption spectrum in methylene chloride and the extinction coefficient is 101,748.

Example 8

A 1.5 g (0.005 m) quantity of 1,3-dihydro-7-methoxycarbonyl-1, 1,3-trimethyl-2H-benz[e]indole-2-ylideneacetaldehyde was reacted with 3-cyano-6-hydroxy-1-(3-hydroxy-2, 2-dimethylpropyl)-4-methyl-2-pyridone (1.2 g, .005 m) in acetic anhydride (15 mL) under the same conditions as described in Example 4 and the product isolated similarly. Mass spectrum analysis shows a mixture of the hydroxy product and the corresponding acetylated product as follows:

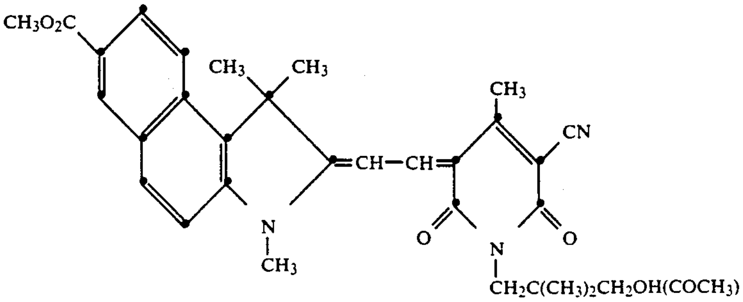

-continued

λ max - 546 nm ($CH_2Cl_2$);

The yield of magenta product was 2.58 g. A visible absorption maximum (λ max) is observed at 546 nm ϵmax=129,083), based on the molecular weight of the hydroxy derivative, in the visible absorption spectrum in methylene chloride solution.

Preparation of Polyesters Containing Copolymerized Colorants

Example 9

The following materials are placed in a 500 mL three-necked, round-bottom flask:

110.8 g (0.571 mol) dimethyl terephthalate
81.0 g (0.90 mol) 1,4-butanediol
0.0141 g Ti from a n-butanol solution of titanium isopropoxide
14.5 g (0.0285 m) 1H-benz[e]indole-7-carboxylic acid, 2,3-dihydro-2-[[4-(methoxycarbonyl)-5-oxo-3-phenyl-2-(5H)-furanylidene]ethylidene]-1,3,3-trimethyl-, methyl ester (from Example 2).

The flask was equipped with a nitrogen inlet, stirrer, vacuum outlet and condensing flask. The flask and contents were heated in a Belmont metal bath with a nitrogen sweep over the reaction mixture as the temperature was increased to 200° C. and then to 230° C. over 2.25 hours. Vacuum was applied until the pressure was reduced to about 0.5 mm Hg and the temperature held at 230° C. for 30 minutes with the pressure remaining at 0.1–0.5 mm Hg. The vacuum was then relieved with nitrogen and methyl benzoate (125 mL) was added slowly and stirring continued for 5 minutes to complete solution with the flask still in the metal bath. The resulting solution was transferred to a 2L beaker and stirred until crystallization occurred. Acetone (700 mL) was added slowly with stirring to dilute the slurry and keep it stirrable. The diluted slurry was stirred for about 30 minutes, filtered and the cake washed with acetone. The cake was thrice reslurried in acetone and then dried in a vacuum oven at 50° C. for 48 hours. The resulting dark red semicrystalline polyester powder, containing 10.3 wt % of the methine colorant residue, has an inherent viscosity of 0.31, a melting temperature of 220° C., a weight average molecular weight of 17,264, a member average molecular weight of 12,546 and a polydispersity value of 1.38. The weight of recovered powder was 128.5 g.

Example 10

Dimethyl terephthalate (89.5 g, 0.464 m), 1,4-butanediol (67.5 g, 0.75 m) and magenta colorant of Example 2 (18.50 g, 0.0363 m) were copolymerized using 0.0121 g of titanium catalyst as described in Example 9. The resulting polymer was converted into a semicrystalline powder using methyl benzoate and acetone as described in Example 9. The resulting bright red polymer has an inherent viscosity of 0.36 and contains 15.2% by weight of the red colorant. When tested, the polymer showed a melting temperature of 217° C., a weight average molecular weight of 18,213, a number average molecular weight of 12,980 and a polydispersity of 1.4.

Example 11

The following materials were placed in a 500 mL three-necked, round-bottom flask:

114.8 g (0.592 mol) dimethyl terephthalate
94.5 g (1.05 mol) 1,4-butanediol
0.0142 g Ti from a n-butanol solution of tetraisopropoxide
55.0 g (0.108 mol) magenta colorant of Example 2

The flask was equipped with a nitrogen inlet, stirrer, vacuum outlet and a condensing flask. The flask and contents were heated in a Belmont metal bath with a nitrogen sweep over the reaction mixture as the temperature was increased to 200° C. and then to 220° C. over 2 hours. Over the next 30 minutes, the temperature was increased to about 240° C. and then to about 260° C. over the next 30 minutes. The temperature was quickly raised (over about 10 minutes) to 275° C. and a vacuum applied until the pressure was reduced to about 0.5 mm Hg and the polycondensation reaction was completed by heating the flask and contents at about 275° C. for about 15 minutes under a pressure of 0.1–0.5 mm Hg. The vacuum was then relieved with nitrogen and methyl benzoate (125 mL) is added slowly and stirred to solution over about 10 minutes with the flask still in the metal bath. The resulting solution was transferred to a 2 L beaker and stirred until crystallization occurred. A 50:50 acetone:hexane mixture (1 L) was added slowly with stirring to dilute the slurry and facilitate stirring. The diluted slurry was stirred for 30 minutes, filtered and the cake twice reslurried in hexane and then dried in air. The resulting dark red semicrystalline polyester powder, containing ~30% by weight of the methine colorant residue, has an inherent viscosity of 0.135, a melting temperature of 185° C., a weight average molecular weight of 6,184, a number average molecular weight of 3,757 and a polydispersity value of 1.65. The weight of powder recovered is 129.4 g (88.8% of the theoretical).

Example 12

Dimethyl terephthalate (116.15 g, 0.599 m), 1,4-butanediol (81.00 g, 0.90 m) and the magenta colorant of Example 8 (1.35 g) were copolymerized using 0.0133 g titanium catalyst as described in Example 9 and the polymeric color concentrate similarly converted into a red semicrystalline powder using methyl benzoate and acetone. The magenta colored powder contained about 1.0% by weight of the residue of the starting magenta colorant and shows an inherent viscosity of 0.227, a melting temperature of 218° C., a weight average molecular weight of 11,089, a number average molecular weight of 8,166 and a polydispersity value of 1.36. A yield of 130.4 g of product was obtained.

Example 13

Example 12 was repeated using 110.97 g (0.572 m) of dimethyl terephthalate, 81.0 g (0.90 m) of 1,4-butanediol and 30.0 g (0.057 m) of the magenta colorant of Example 8 to yield a dark red polyester powder containing ~19.5% by weight of magenta colorant residue (yield 151.2 g). When tested, the polymer has an inherent viscosity of 0.150, a melting temperature of 205° C., a weight average molecular weight of 8,406, a number average molecular weight of 4,997 and a polydispersity value of 1.68.

Example 14

Dimethyl terephthalate (108.44 g, 0.559 m), 1,4-butanediol (94.5 g, 1.05 m) and the yellow methine colorant of Example 3 (55.0 g, 0.141 m) were copolymerized using 0.0182 g Ti catalyst as described in Example 11 and the polyester color concentrate similarly converted to the yellow semicrystalline powder. A yield of 168.3 g of polymer, which contained ~30 3% by weight of the yellow methine colorant residue was obtained. When tested, the polymer had an inherent viscosity of 0.18, a melting temperature of 185° C., a weight average molecular weight of 9,417, a number average molecular weight of 6,844 and a polydispersity value of 1.4.

Example 15

Dimethyl terephthalate (110.68 g, 0.570 m), neopentyl glycol (81.12 g, 0.78 m), and the magenta colorant of Example 2 were copolymerized using 0.0149 g Ti catalyst using the procedure described in Example 9 to complete the polycondensation step. The amorphous color concentrate, which contained ~10.0% by weight of the magenta colorant residue, was granulated using a Wiley mill. When tested, the polymer showed an inherent viscosity of 0.22 when measured in a 60/40 ratio by weight of phenol/tetrachloroethane at a concentration of 0.5 g per 100 mL, no melting temperature, a weight average molecular weight of 13,545, a number average molecular weight of 9,136 and a polydispersity value of 1.48.

Example 16

The following materials were placed in a 500 mL three-necked, round-bottom flask:

- 97.0 g (0.50 m) dimethyl terephthalate
- 62.0 g (1.00 m) ethylene glycol
- 0.00192 g Ti from a n-butanol solution of acetyltriisopropyl titanate
- 0.0053 g Mn from an ethylene glycol solution of manganese acetate
- 0.0345 g antimony trioxide
- 0.0072 g Co from an ethylene glycol solution of cobaltous acetate
- 0.0192 g methine colorant from Example 2 (200 ppm by weight)

The flask was equipped with a nitrogen inlet, stirrer, vacuum outlet, and condensing flask. The flask and contents were heated at 200° C. in a Belmont metal bath for 60 minutes and at 210° C. for 75 minutes with a nitrogen sweep over the reaction mixture. Then 1.57 mL of an ethylene glycol slurry of a mixed phosphorus ester composition (MERPOL A) which contains 0.012 g phosphorous is added. The temperature was increased to 230° C. and vacuum applied with a slow stream of nitrogen bleeding in the system until the pressure is reduced to about 180 mm Hg. The flask and contents were heated at about 230° C. under a pressure of about 170–180 mm Hg for 20 minutes and the temperature then increased to about 270° C. At 270° C., the pressure was reduced slowly to about 100 mm Hg and heating continued at about 270° C. for 30 minutes. The metal bath temperature was increased to 285° C. and the pressure slowly reduced to about 6 mm Hg. The flask and contents were heated at 285° C. under a pressure of about 6 mm Hg for 25 minutes. Then the pressure was reduced to 0.3 mm Hg and polycondensation continued for 40 minutes. The flask was removed from the metal bath and allowed to cool in a nitrogen atmosphere while the polymer crystallized. The resulting pink polymer has an inherent viscosity of 0.53 measured in a 60/40 ratio by weight of phenol/tetrachloroethane at a concentration of 0.5 g per 100 mL. An amorphous 14.5 mil film molded from this polymer strongly absorbs visible light in the 500–575 nm range, which indicates excellent thermal stability for the colorant.

Example 17

The polymerization procedure of Example 16 was repeated using 0.0192 g (200 ppm) of the bis-methine colorant of Example 7. The resulting yellow polymer has an inherent viscosity of 0.63. An amorphous 14.5 mil film is clear and absorbs visible light strongly in the 425–475 nm range, which indicates excellent thermal stability for the colorant.

The invention is illustrated further by the examples of Tables III–X.

TABLE I

COMPARATIVE EXTINCTION COEFFICIENTS

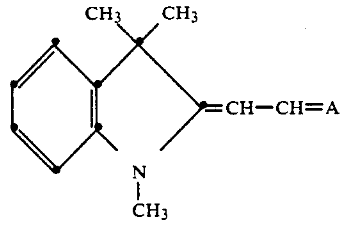

VI versus

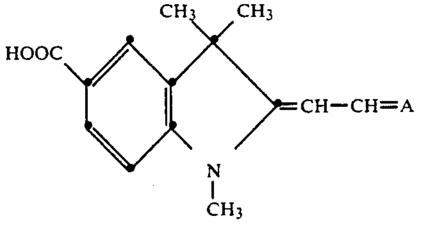

VII

| A | ε, VI | ε, VII |
|---|---|---|
| $=C(CN)CO_2CH_3$ | 65,197<br>λ max - 433 nm ($CH_2Cl_2$) | 62,638<br>λ max - 436 nm ($CH_2Cl_2$/DMF) |
| 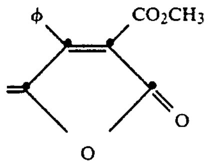 | 71,820<br>λ max - 541 nm ($CH_2Cl_2$) | 57,694<br>λ max - 531 nm ($CH_2Cl_2$) |

TABLE I-continued

COMPARATIVE EXTINCTION COEFFICIENTS

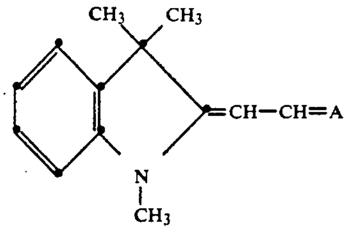

VI versus

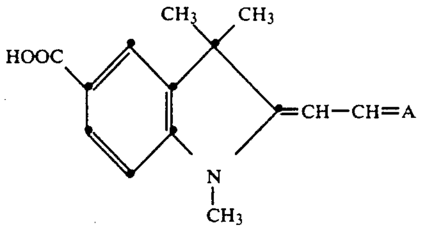

VII

| A | $\epsilon$, VI | $\epsilon$, VII |
|---|---|---|
| 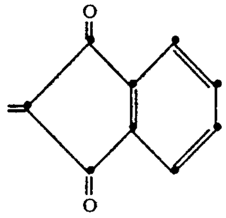 | 114,126<br>$\lambda$ max - 491 nm ($CH_2Cl_2$) | 82,168<br>$\lambda$ max - 496 nm (DMF) |
| 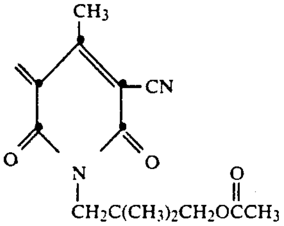 | 126,037<br>$\lambda$ max - 523 nm ($CH_2Cl_2$) | 99,541<br>$\lambda$ max - 529 nm ($CH_2Cl_2$) |

TABLE II

COMPARATIVE EXTINCTION COEFFICIENTS

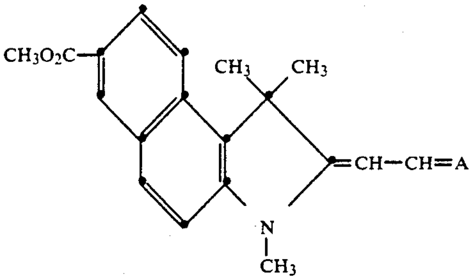

I versus

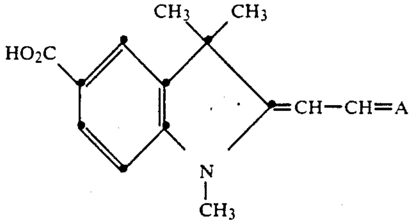

VII

| A | $\epsilon$, I | $\epsilon$, VII | $\Delta\epsilon$, VII |
|---|---|---|---|
| $=C(CN)CO_2CH_3$ | 75,599<br>$\lambda$ max - 457 nm ($CH_2Cl_2$) | 62,638<br>$\lambda$ max - 436 nm ($CH_2Cl_2$/DMF) | 12,961 |
| 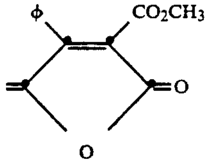 | 68,750<br>$\lambda$ max - 558 nm ($CH_2Cl_2$) | 57,694<br>$\lambda$ max - 531 nm ($CH_2Cl_2$) | 11,056 |
| 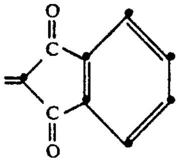 | 124,851<br>$\lambda$ max - 512 nm ($CH_2Cl_2$) | 82,168<br>$\lambda$ max - 496 nm (DMF) | 42,683 |

TABLE II-continued

COMPARATIVE EXTINCTION COEFFICIENTS

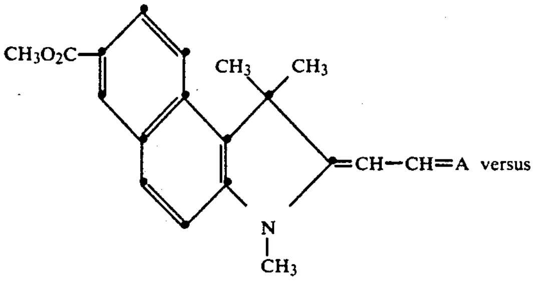

I

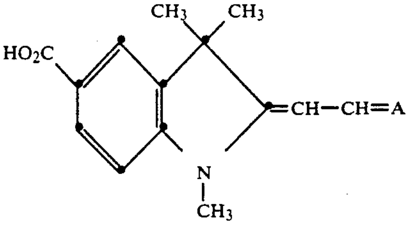

VII

| A | ε, I | ε, VII | Δε, VII |
|---|---|---|---|
| 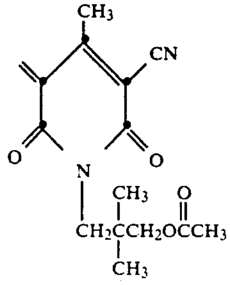 | 129,083<br>λ max - 546 nm ($CH_2Cl_2$) | 99,541<br>λ max - 529 nm ($CH_2Cl_2$) | 29,542 |

The following tables further illustrate compounds of Formulae (I) and (II):

TABLE III

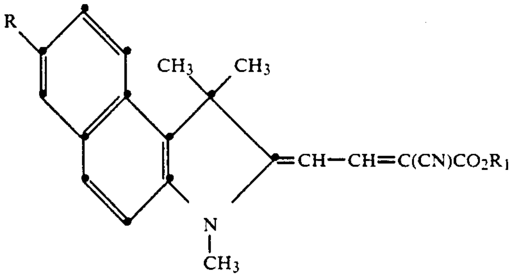

| Ex. No. | R | $R_1$ |
|---|---|---|
| 18 | COOH | $CH_3$ |
| 19 | COOH | $CH_2CH_3$ |
| 20 | COOH | $C_6H_{11}$ |
| 21 | COOH | $CH_2C_6H_{11}$ |
| 22 | COOH | $CH_2CH_2OH$ |
| 23 | $CO_2CH_3$ | $CH_2CH_2Cl$ |
| 24 | $CO_2CH_3$ | $CH_2C_6H_5$ |
| 25 | $CO_2C_2H_5$ | $CH_2CH_2C_6H_5$ |
| 26 | $CO_2C_2H_5$ | $CH_2CH_2NHCOCH_3$ |
| 27 | $CO_2C_6H_{11}$ | $CH_2CH_2CN$ |
| 28 | $CO_2CH_2CH_2OH$ | $CH_2CH{=}CH_2$ |
| 29 | $CO_2CH_2CH_2OC_2H_5$ | $CH_2CH_2OC_2H_5$ |
| 30 | $CO_2CH_2C_6H_5$ | $CH(CH_3)_2$ |
| 31 | $CO_2C_6H_4$-4-$CH_3$ | $CH_2CH(CH_3)_2$ |
| 32 | $CO_2CH_2CH_2OC_6H_5$ | $CH_2CH(C_2H_5)C_4H_9$-n |
| 33 | 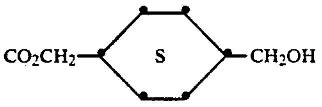 | 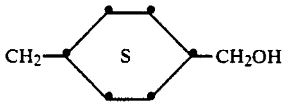 |
| 34 | 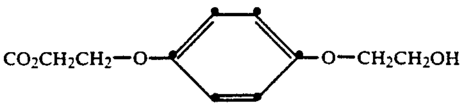 | 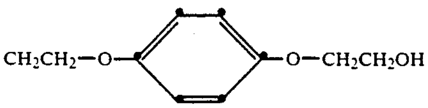 |

TABLE III-continued

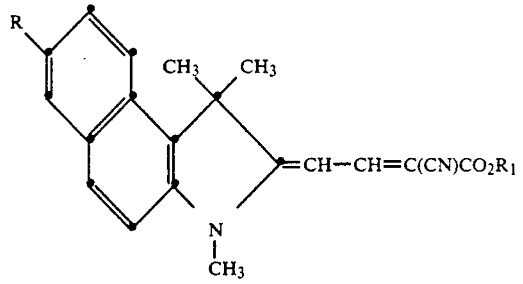

| Ex. No. | R | $R_1$ |
|---|---|---|
| 35 | $CO_2CH_2CH_2OCOCH_3$ | $CH_2CH_2OCOCH_3$ |
| 36 | $CO_2CH_3$ | $CH_2CH_2CONH_2$ |
| 37 | $CO_2CH_3$ | $CH_2CH(OH)CH_2OH$ |
| 38 | $CO_2CH_3$ | $CH_2CH(OCOCH_3)CH_2OCOCH_3$ |
| 39 | $CO_2CH_3$ | $CH_2CH_2OC_6H_5$ |
| 40 | $CO_2CH_3$ | $CH_2CH_2SC_2H_5$ |
| 41 | $CO_2CH_3$ | $CH_2CH_2CH_2SO_2CH_3$ |
| 42 | $CO_2CH_3$ | $CH_2CH_2N(CH_3)SO_2CH_3$ |
| 43 | $CO_2CH_3$ | $CH_2C_6H_5$ |
| 44 | $CO_2CH_3$ | 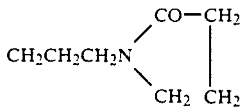 |
| 45 | $CO_2CH_3$ | $CH_2CH_2OCH_2CH_2OC_2H_5$ |

TABLE IV

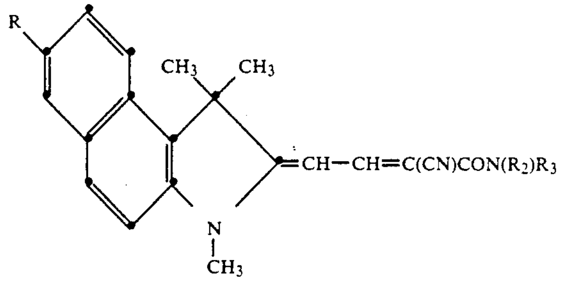

| Ex. No. | R | $R_2$ | $R_3$ |
|---|---|---|---|
| 46 | $CO_2CH_3$ | H | H |
| 47 | $CO_2CH_3$ | H | $CH_3$ |
| 48 | $CO_2CH_3$ | $CH_3$ | $CH_3$ |
| 49 | $CO_2CH_3$ | $CH_3$ | $C_6H_5$ |
| 50 | $CO_2CH_3$ | $C_2H_5$ | $C_6H_4$-3-$CH_3$ |
| 51 | $CO_2CH_3$ | H | $C_6H_4$-4-$OCH_3$ |
| 52 | $CO_2C_2H_5$ | H | $C_6H_4$-2-$OCH_3$ |
| 53 | $CO_2C_2H_5$ | H | $C_6H_4$-4-$C_2H_4OH$ |
| 54 | $CO_2C_2H_5$ | H | $C_6H_4$-4-$CO_2C_2H_5$ |
| 55 | $CO_2H$ | H | $C_6H_{11}$ |
| 56 | $CO_2H$ | $CH_3$ | $C_6H_{11}$ |
| 57 | $CO_2H$ | $CH_2CH_2OH$ | $CH_2CH_2OH$ |
| 58 | $CO_2H$ | H | $CH_2CH_2CH_2OCH_3$ |
| 59 | $CO_2H$ | H | $CH_2C_6H_{11}$ |
| 60 | $CO_2CH_2CH_2OH$ | H | $CH_2C_6H_{10}$-4-$CH_2OH$ |
| 61 | $CO_2CH_2CH(CH_3)_2$ | $CH_2CH_2OCOCH_3$ | $CH_2CH_2OCOCH_3$ |
| 62 | $CO_2C_6H_5$ | 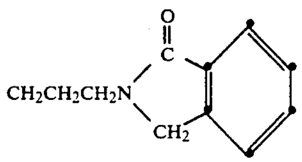 | H |
| 63 | $CO_2C_6H_{11}$ | $CH_2CH(OH)CH_2Cl$ | H |
| 64 | $CO_2H$ | $C_6H_5$ | $C_6H_5$ |
| 65 | $CO_2H$ | $C_6H_5$ | $C_6H_{11}$ |
| 66 | $CO_2H$ | H | $C_6H_3$-2,5-diCl |

TABLE IV-continued

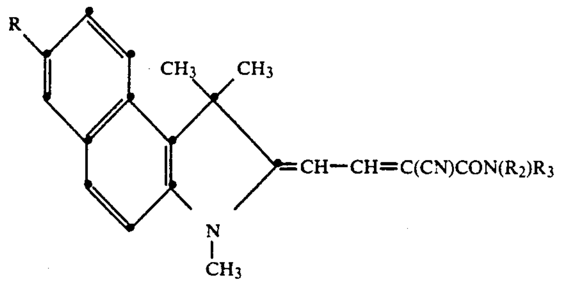

| Ex. No. | R | $R_2$ | $R_3$ |
|---|---|---|---|
| 67 | $CO_2H$ | H | $C_6H_3$-2-$OCH_3$-5-$CH_3$ |
| 68 | $CO_2H$ | H | $C_6H_3$-2-$OCH_3$-5-$SO_2NHCH_3$ |
| 69 | $CO_2CH_3$ | H | $CH_2CH{=}CH_2$ |
| 70 | $CO_2CH_3$ | H | 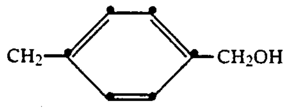 |
| 71 | $CO_2CH_3$ | H | $CH_2CH_2OC_6H_5$ |
| 72 | $CO_2CH_3$ | H | $CH_2CH_2CH_2CN$ |
| 73 | $CO_2CH_3$ | H | $CH_2CHF_2$ |

TABLE V

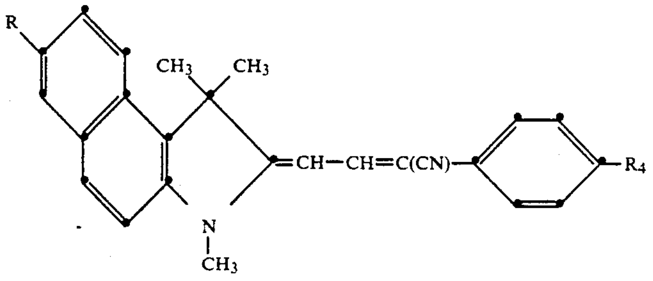

| Ex. No. | R | $R_4$ |
|---|---|---|
| 74 | COOH | H |
| 75 | COOH | 3-$CH_3$ |
| 76 | COOH | 2-$OCH_3$ |
| 77 | COOH | 2,5-diBr |
| 78 | COOH | 2-$OCH_3$-5-$CH_3$ |
| 79 | COOH | 2-$CO_2H$ |
| 80 | COOH | 3-$CO_2CH_3$ |
| 81 | $CO_2CH_3$ | 4-$CO_2CH_3$ |
| 82 | $CO_2CH_3$ | 4-$CO_2CH_2CH_2OH$ |
| 83 | $CO_2CH_3$ | 4-$CO_2CH_2CH_2Br$ |
| 84 | $CO_2CH_2CH_3$ | 3-$CO_2C_2H_5$ |
| 85 | $CO_2C_6H_{11}$ | 4-$CO_2C_6H_{11}$ |
| 86 | $CO_2C_6H_{11}$ | 4-$CO_2CH_2C_6H_{11}$ |
| 87 | 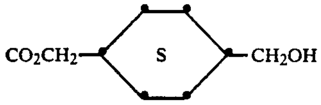 | 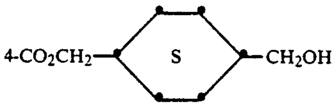 |
| 88 | $CO_2CH_2CH_2OC_2H_5$ | 4-$CO_2CH_2CH_2OC_2H_5$ |
| 89 | $CO_2C_6H_5$ | 4-$CO_2C_6H_5$ |
| 90 | $CO_2CH_2C_6H_5$ | 4-$CO_2CH_2C_6H_5$ |
| 91 | $CO_2CH_2CH_2OC_6H_5$ | 4-$CO_2CH_2CH_2OC_6H_5$ |
| 92 | $CO_2CH_2CH_2CN$ | 4-$CO_2CH_2CH_2CN$ |
| 93 | $CO_2CH_2C_6H_5$ | 4-$CO_2CH_2C_6H_5$ |
| 94 | $CO_2CH_2C_6H_4$-4-$CH_3$ | 4-$CO_2C_6H_4$-4-$CH_3$ |
| 95 | $CO_2CH_2CH{=}CH_2$ | 4-$CO_2CH_2CH{=}CH_2$ |

TABLE V-continued
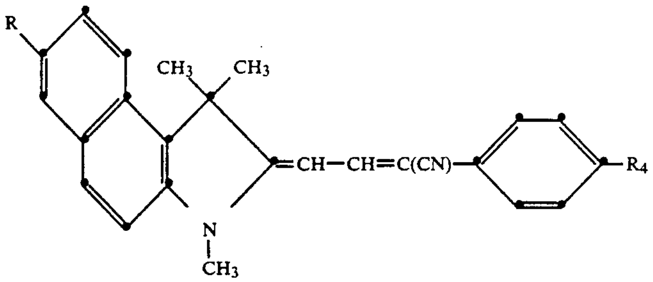
| Ex. No. | R | $R_4$ |
|---|---|---|
| 96 | 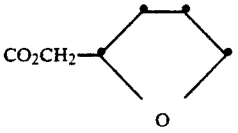 | 4-$CO_2CH_3$ |
| 97 | 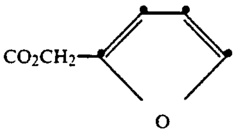 | 4-$CO_2CH_3$ |
| 98 | $CO_2C_4H_9$-n | 4-$CO_2C_4H_9$-n |
| 99 | $CO_2CH_2CH(OH)CH_2OH$ | 4-COOH |
| 100 | $CO_2CH_2CH(Cl)CH_2Cl$ | 4-COOH |
| 101 | $CO_2CH_2CF_3$ | 4-COOH |
TABLE VI
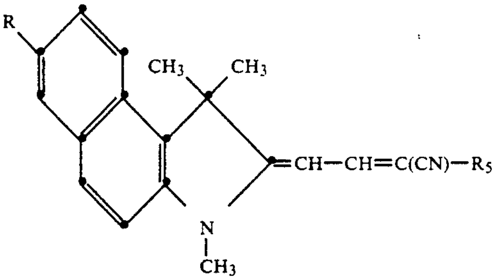
| Ex. No. | R | $R_5$ |
|---|---|---|
| 102 | COOH | 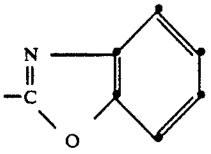 |
| 103 | COOH | 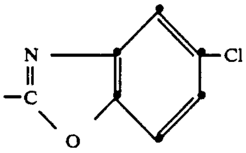 |
| 104 | COOH | 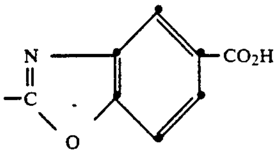 |
TABLE VI-continued
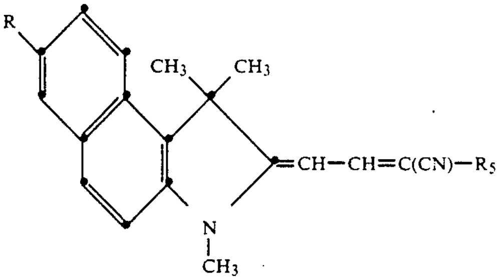
| Ex. No. | R | $R_5$ |
|---|---|---|
| 105 | $CO_2CH_3$ | 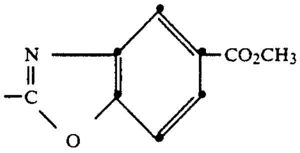 |
| 106 | $CO_2CH_3$ | 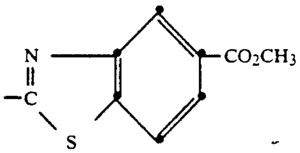 |
| 107 | $CO_2CH_3$ | 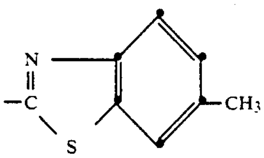 |

TABLE VI-continued
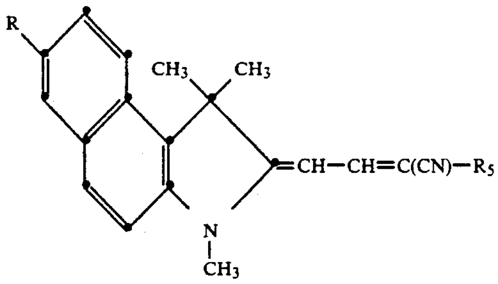
| Ex. No. | R | $R_5$ |
|---|---|---|
| 108 | $CO_2C_2H_5$ | 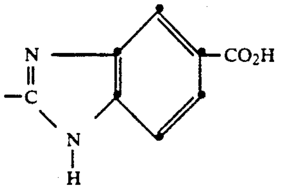 |
| 109 | $CO_2CH_3$ | 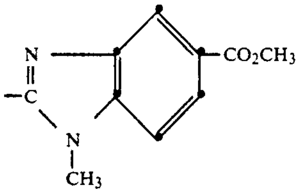 |
| 110 | $CO_2CH_3$ | 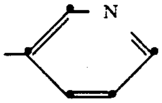 |
| 111 | $CO_2CH_3$ | 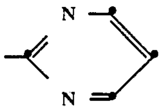 |
TABLE VI-continued
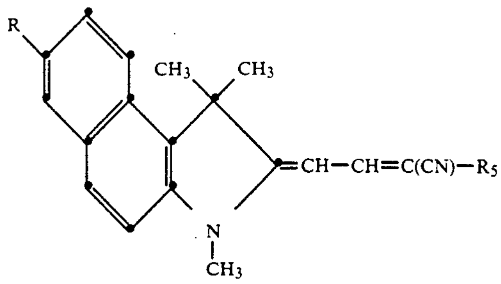
| Ex. No. | R | $R_5$ |
|---|---|---|
| 112 | $CO_2CH_3$ | 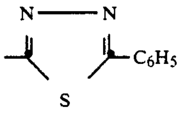 |
| 113 | $CO_2CH_3$ | 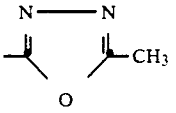 |
| 114 | $CO_2CH_3$ | 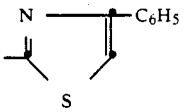 |
| 115 | $CO_2H$ | 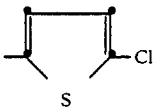 |
| 116 | $CO_2H$ | 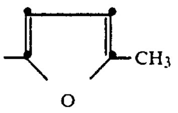 |
| 117 | $CO_2H$ | 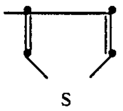 |
TABLE VII
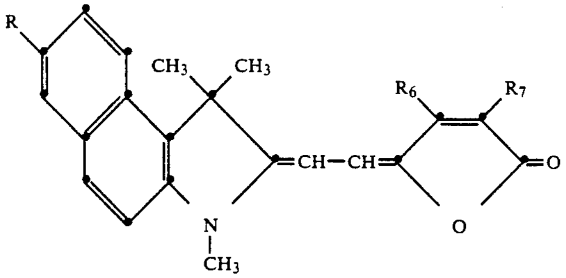
| Ex. No. | R | $R_6$ | $R_7$ |
|---|---|---|---|
| 118 | COOH | $CH_3$ | $CO_2H$ |
| 119 | $CO_2CH_3$ | $C_2H_5$ | CN |
| 120 | $CO_2CH_3$ | $CH_2OCH_3$ | $CONH_2$ |
| 121 | $CO_2CH_3$ | $C_6H_5$ | CN |
| 122 | $CO_2CH_3$ | $C_6H_5$ | $SO_2CH_3$ |
| 123 | $CO_2CH_3$ | $C_6H_5$ | $SO_2C_6H_5$ |
| 124 | $CO_2CH_3$ | $C_6H_5$ | $CONHC_2H_5$ |
| 125 | $CO_2CH_3$ | $C_6H_5$ | $CONHC_2H_4OH$ |
| 126 | $CO_2CH_3$ | $C_6H_5$ | $CON(CH_3)C_2H_4OH$ |
| 127 | $CO_2CH_3$ | $C_6H_5$ | $CONHC_6H_5$ |

TABLE VII-continued

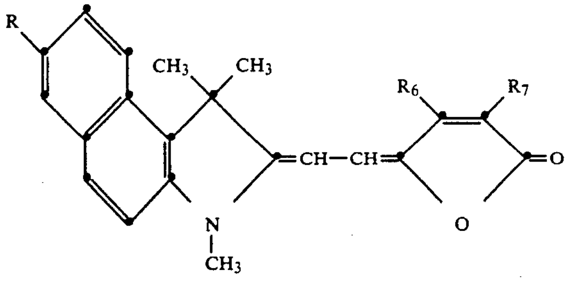

| Ex. No. | R | $R_6$ | $R_7$ |
|---|---|---|---|
| 128 | $CO_2C_2H_5$ | $C_6H_5$ | $CONHC_6H_4$-4-$CO_2CH_3$ |
| 129 | $CO_2CH_2CH_2OH$ | $C_6H_5$ | $CONHC_6H_{11}$ |
| 130 | $CO_2CH_2CH_2OCH_3$ | $C_6H_5$ | $CO_2CH_2CH_2OCH_3$ |
| 131 | $CO_2C_4H_9$-n | $C_6H_4$-4-$CH_3$ | $CO_2CH_2CH_2Cl$ |
| 132 | $CO_2CH_2CH(CH_3)_2$ | $C_6H_4$-4-$OCH_3$ | $CONH_2$ |
| 133 | $CO_2CH_2C_6H_5$ | $C_6H_4$-4-Cl | 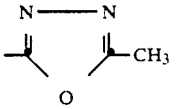  |
| 134 | $CO_2CH_2C_6H_{11}$ | $C_6H_3$-2-$OCH_3$-5-Cl | $C_6H_4$-4-$CO_2CH_3$ |
| 135 | COOH | $C_6H_5$ | 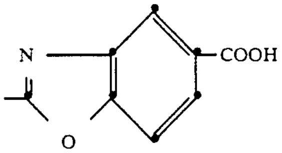  |
| 136 | $CO_2CH_3$ | $C_6H_5$ | 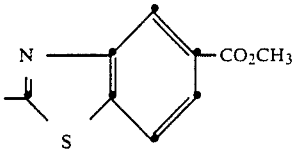  |
| 137 | $CO_2CH_3$ | $C_6H_5$ | 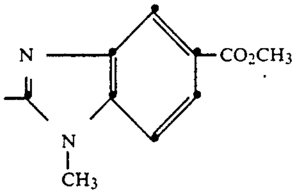  |
| 138 | $CO_2CH_3$ | 2-thienyl | $CO_2CH_3$ |
| 139 | $CO_2CH_3$ | 5-Cl-2-thienyl | $CONHC_2H_4OH$ |
| 140 | $CO_2CH_3$ | 1-naphthyl | 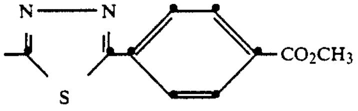  |
| 141 | $CO_2CH_3$ | 2-naphthyl | 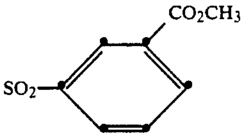  |
| 142 | $CO_2CH_3$ | 2,5-diCl—$C_6H_3$— | $SO_2CH_2CH_2CH_2OH$ |
| 143 | $CO_2CH_2CH(OH)CH_2OH$ | 3-pyridyl | 3-pyridyl |
| 144 | $CO_2C_6H_{11}$ | 2,4-di-$OCH_3C_6H_3$— | $CONCH_2C_6H_{10}$-4-$CH_2OH$ |
| 145 | $CO_2CH_2CH_2OCOCH_3$ | 2,5-di-$CH_3C_6H_3$— | $CONHC_6H_4$-4-$CH_2CH_2OH$ |

TABLE VIII

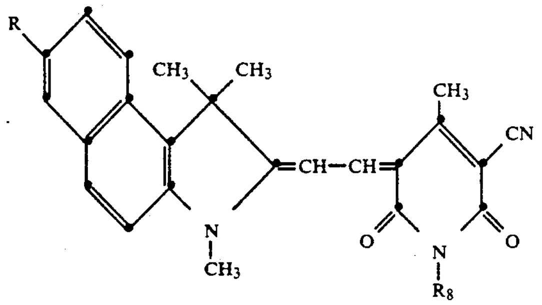

| Ex. No. | R | $R_8$ |
|---|---|---|
| 146 | COOH | H |
| 147 | COOH | $CH_3$ |
| 148 | COOH | $C_2H_5$ |
| 149 | COOH | $C_6H_{11}$ |
| 150 | COOH | $C_6H_5$ |
| 151 | COOH | $CH_2CH_2OH$ |
| 152 | $CO_2H$ | $CH_2CH_2CH_2CH_2CO_2CH_3$ |
| 153 | $CO_2CH_3$ | $CH_2CH_2CH_2CH_2OH$ |
| 154 | $CO_2CH_3$ | $C_6H_4$-4-$CH_2CH_2OH$ |
| 155 | $CO_2CH_3$ | $C_6H_4$-4-$CO_2CH_3$ |
| 156 | COOH | $CH_2C(CH)_2CH_2OH$ |
| 157 | $CO_2CH_3$ | $CH_2C(CH_3)_2CH_2NH_2$ |
| 158 | $CO_2CH_3$ | $CH_2C(CH_3)_2CH_2CO_2H$ |
| 159 | $CO_2CH_3$ | $CH_2C_6H_{10}$-4-$CH_2OH$ |
| 160 | $CO_2CH_3$ | $C_6H_4$-4-$CH_2CO_2CH_3$ |
| 161 | $CO_2CH_3$ | $C_6H_4$-4-$OCH_2CO_2CH_3$ |
| 162 | $CO_2C_2H_5$ | $CH_2CH_2OCOCH_3$ |
| 163 | $CO_2C_4H_9$-n | $CH_2CH_2OCONHC_6H_5$ |
| 164 | $CO_2C_2H_4OCH_3$ | $CH_2CH_2OCO_2C_2H_5$ |
| 165 | $CO_2CH_2CH_2CN$ | $CH_2CH_2OCON(CH_3)_2$ |
| 166 | $CO_2CH_2C_6H_5$ | $CH_2C_6H_4$-4-$CO_2CH_3$ |
| 167 | $CO_2C_6H_{11}$ | $CH_2CH_2OC_6H_4$-3-$CO_2CH_3$ |
| 168 | $CO_2C_6H_5$ | $CH_2CH_2OCH_2CH_2OH$ |
| 169 | $CO_2C_6H_4$-4-$CH_3$ | $(CH_2CH_2O)_3H$ |
| 170 | $CO_2CH_2CH(CH_3)_2$ | $CH_2CH_2SCH_2CH_2OH$ |
| 171 | $CO_2CH_2CH_2Cl$ | $CH_2C_6H_4$-4-COOH |
| 172 | $CO_2CH_2CH_2OC_6H_5$ | $CH_2CH_2SC_6H_4$-2-COOH |
| 173 | $CO_2H$ | $CH_2CH_2N(SO_2CH_3)C_2H_4OH$ |
| 174 | $CO_2H$ | $CH_2CH_2C_6H_4$-4-$CO_2H$ |
| 175 | $CO_2H$ | $CH_2CH_2OC_6H_4$-3-$CO_2H$ |
| 176 | $CO_2C_2H_4OH$ | $CH_2C_6H_4$-4-$CO_2C_2H_4OH$ |

TABLE IX

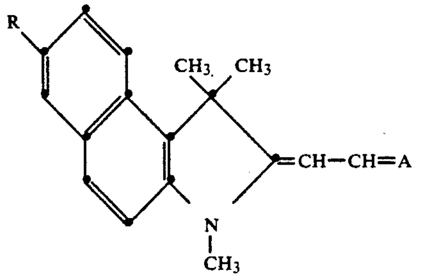

| Ex. No. | R | A |
|---|---|---|
| 177 | COOH | 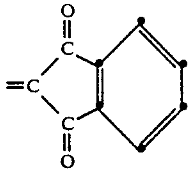 |

TABLE IX-continued

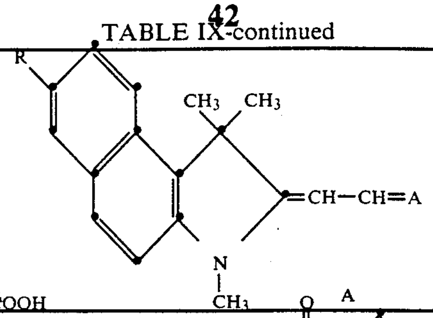

| No. | R | A |
|---|---|---|
| 178 | COOH | 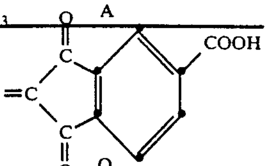 |
| 179 | $CO_2CH_3$ | 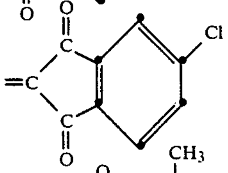 |
| 180 | $CO_2CH_3$ | 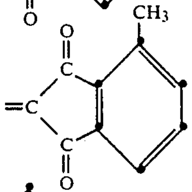 |
| 181 | COOH | 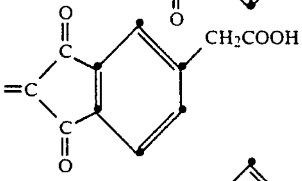 |
| 182 | COOH | 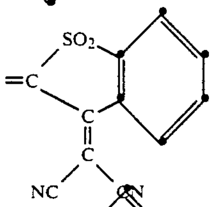 |
| 183 | COOH | 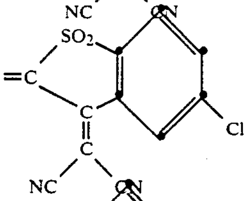 |
| 184 | $CO_2CH_3$ | 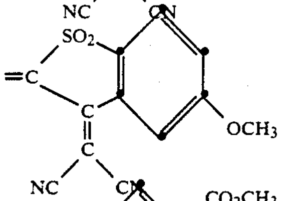 |
| 185 | $CO_2CH_3$ | 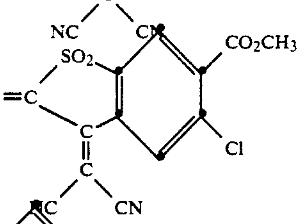 |
| 186 | $CO_2H$ | 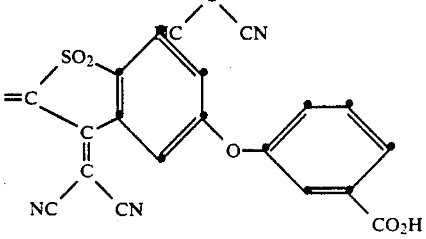 |

TABLE X

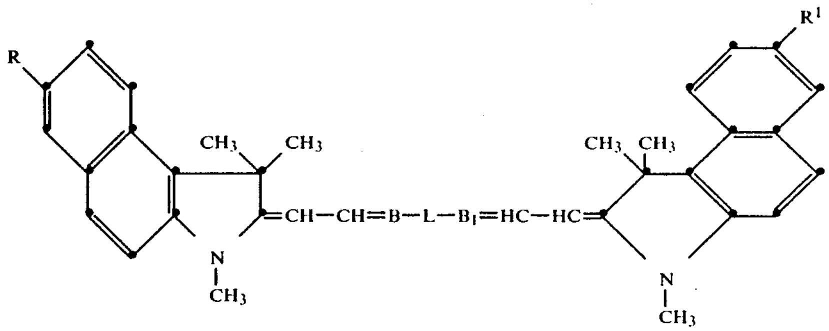

| Ex. No. | R¹ | R | B | L | B₁ |
|---|---|---|---|---|---|
| 187 | COOH | COOH | $=C(CN)CO_2-$ | $-CH_2CH_2-$ | $=C(CN)CO_2-$ |
| 188 | COOH | $CO_2CH_3$ | $=C(CN)CO_2-$ | $-(CH_2)_4-$ | $=C(CN)CO_2-$ |
| 189 | $CO_2CH_3$ | $CO_2CH_3$ | | 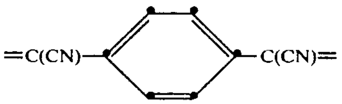 | |
| 190 | $CO_2CH_3$ | $CO_2CH_3$ | $=C(CN)CONH-$ | $-CH_2CH_2-$ | $=C(CN)CONH-$ |
| 191 | $CO_2CH_3$ | $CO_2C_2H_5$ | $=C(CN)CONH-$ | $4-C_6H_4-$ | $=C(CN)CONH-$ |
| 192 | $CO_2H$ | $CO_2H$ | $=C(CN)CONH-$ | 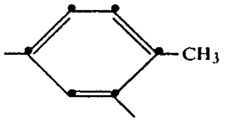 | $=C(CN)CONH-$ |
| 193 | $CO_2CH_3$ | $CO_2CH_2CH_2OH$ | $=C(CN)CONH-$ | 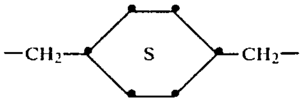 | $=C(CN)CONH-$ |
| 194 | $CO_2C_4H_9$-n | $CO_2C_4H_9$-n | $=C(CN)CO_2-$ | 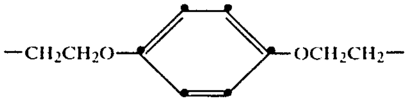 | $=C(CN)CO_2-$ |
| 195 | $CO_2H$ | $CO_2H$ | $=C(CN)CONH-$ | $-CH_2CH_2OCH_2CH_2-$ | $=C(CN)CONH-$ |

TABLE X-continued
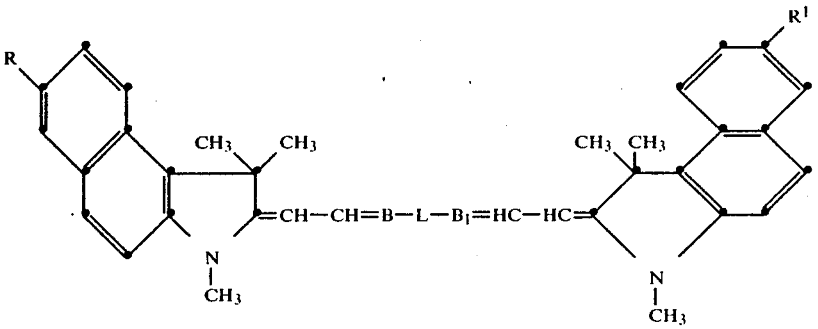
| | | | | | |
|---|---|---|---|---|---|
| 196 | $CO_2H$ | $CO_2H$ | 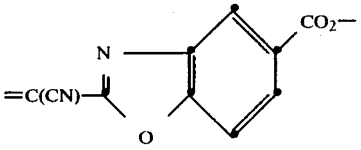 | $-CH_2CH_2-$ | 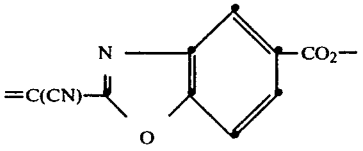 |
| 197 | $CO_2CH_3$ | $CO_2CH_3$ | 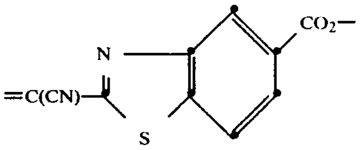 | $-CH_2CH_2SCH_2CH_2-$ | 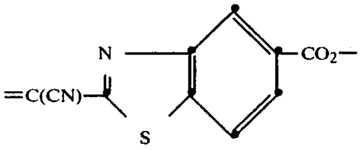 |
| 198 | $CO_2CH_3$ | $CO_2CH_3$ | 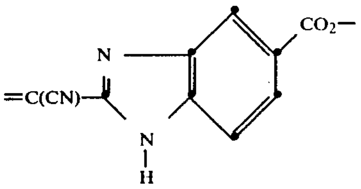 | 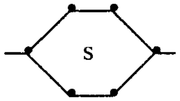 | 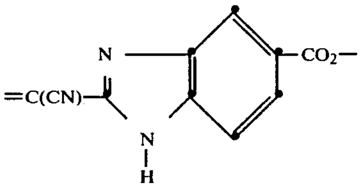 |
| 199 | $CO_2H$ | $CO_2H$ | 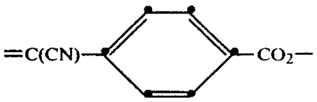 | $-CH_2CH_2-$ | 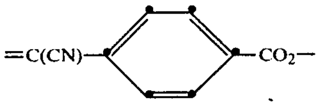 |

TABLE X-continued
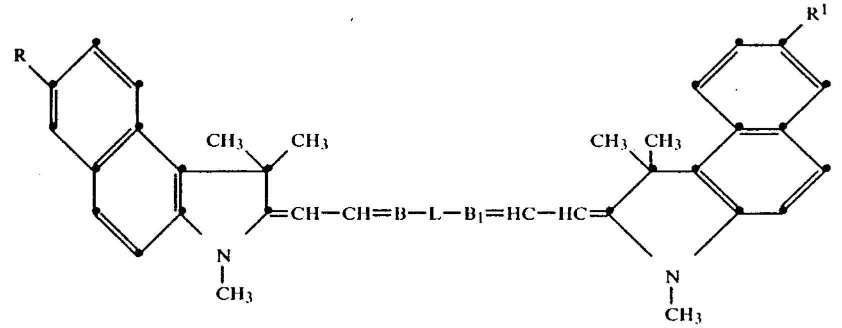
| | R | R¹ | B | L | B₁ |
|---|---|---|---|---|---|
| 200 | $CO_2CH_3$ | $CO_2CH_3$ | 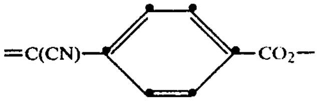 | 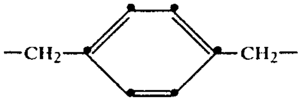 | 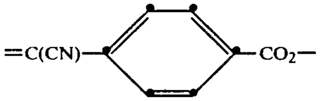 |
| 201 | $CO_2CH_3$ | $CO_2CH_3$ | 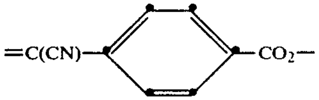 | $-CH_2CH_2-$ | $=C(CN)CO_2-$ |
| 202 | $CO_2CH_3$ | $CO_2CH_2$ | $=C(CN)CO_2-$ | $-(CH_2)_6-$ | $=C(CN)CONH-$ |
| 203 | $CO_2CH_3$ | $CO_2CH_3$ | 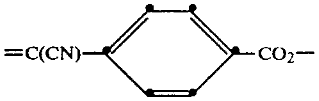 | $-CH_2CH_2N(SO_2CH_3)CH_2CH_2-$ | $=C(CN)CO_2-$ |
| 204 | $CO_2H$ | $CO_2CH_2CH_3$ | $=C(CN)CONH-$ | $-CH_2CH_2OCO_2CH_2CH_2-$ | 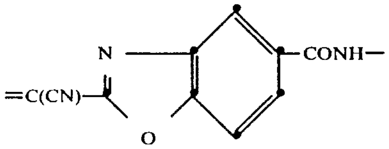 |
| 205 | $CO_2CH_3$ | $CO_2CH_3$ | 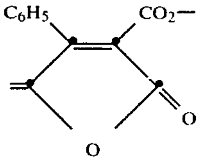 | $-CH_2CH_2-$ | 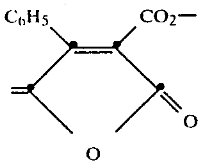 |

TABLE X-continued
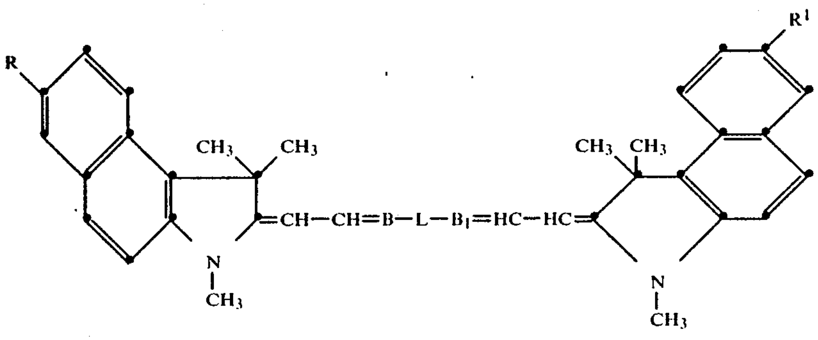
| | | | | | |
|---|---|---|---|---|---|
| 206 | $CO_2H$ | $CO_2CH_3$ | 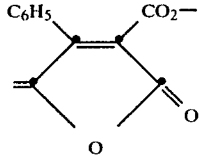 | $—CH_2CH_2CH_2—$ | $=C(CN)CO_2—$ |
| 207 | $CO_2H$ | $CO_2H$ | 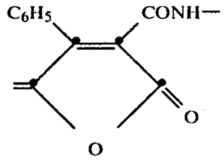 | $—(CH_2)_6$ | 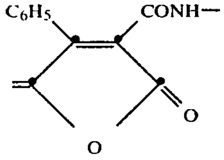 |
| 208 | $CO_2CH_3$ | $CO_2CH_3$ | 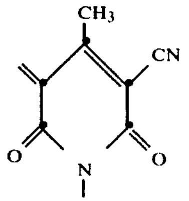 | $—CH_2CH_2—$ | 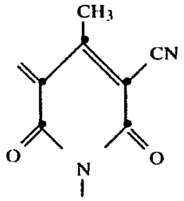 |

TABLE X-continued
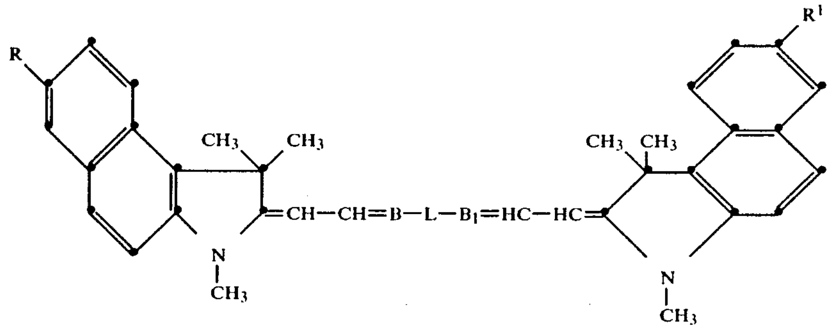
| | | | | | |
|---|---|---|---|---|---|
| 209 | $CO_2CH_3$ | $CO_2CH_3$ | 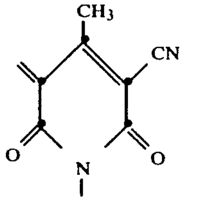 | 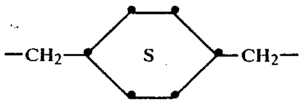 | $=C(CN)CO_2-$ |
| 210 | $CO_2CH_2CH_2OCH_3$ | $CO_2CH_2CH_2OCH_3$ | 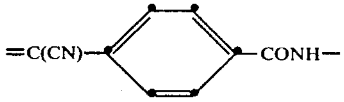 | $-CH_2CH_2SO_2CH_2CH_2-$ | 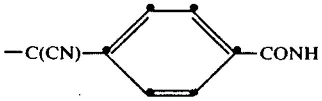 |
| 211 | $CO_2H$ | $CO_2H$ | 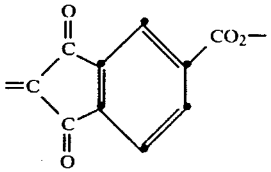 | $-CH_2CH_2-$ | 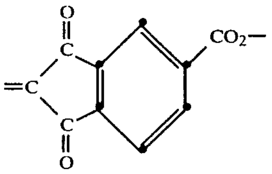 |
| 212 | $CO_2H$ | $CO_2H$ | 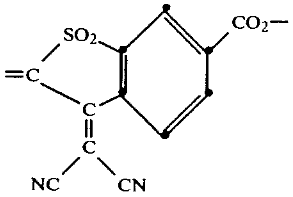 | $-CH_2CH_2-$ | 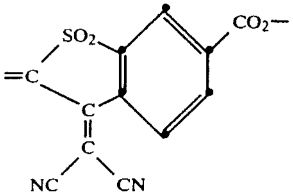 |

TABLE X-continued
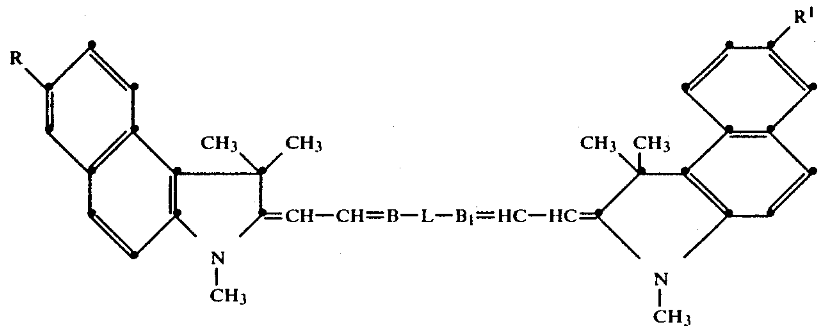
| Ex. No. | $R^1$ | R | B | L | $B_1$ R |
|---|---|---|---|---|---|
| 213 | $CO_2H$ | $CO_2H$ | 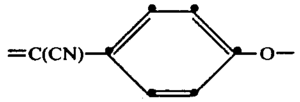 | $-CH_2CH_2-$ | 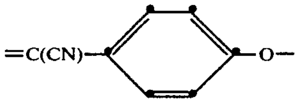 |
| 214 | $CO_2H$ | $CO_2H$ | 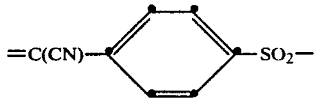 | 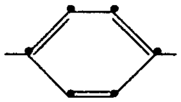 | 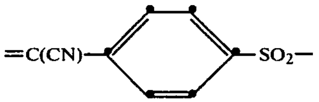 |
| 215 | $CO_2H$ | $CO_2H$ | 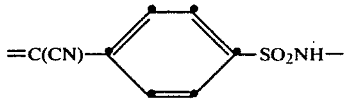 | $-CH_2CH_2-$ | 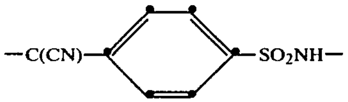 |
| 216 | $CO_2H$ | $CO_2H$ | 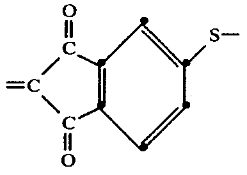 | $-CH_2CH_2-$ | 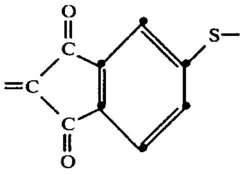 |
| 217 | $CO_2H$ | $CO_2H$ | 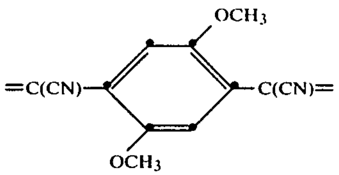 | | |

We claim:

1. A polyester composition having copolymerized therein or reacted therewith at least 0.001 weight percent of a residue of Formulae (I) and/or (II):

(I)

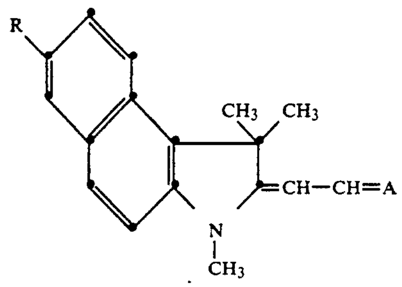

and/or (II)

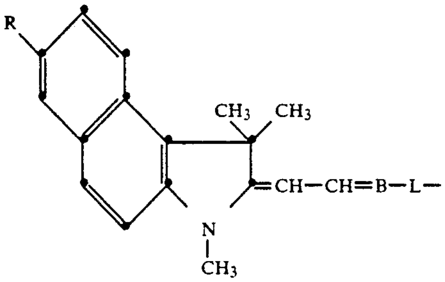

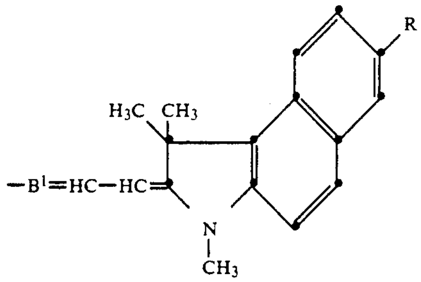

wherein R is carboxy, $C_1$–$C_8$ optionally substituted alkoxycarbonyl, $C_3$–$C_7$ cycloalkoxycarbonyl, $C_3$–$C_8$ alkenyloxycarbonyl or aryloxycarbonyl;

A is a divalent residue of an active methylene component;

B and $B^1$ are the trivalent residues of an active methylene compound; and

L is a $C_1$–$C_{20}$ divalent organic residue.

2. The polyester composition of claim 1 wherein A represents the divalent residue of an active methylene compound selected from α-cyanoacetic acid esters, α-cyanoacetamides, α-arylacetonitriles, 2(5H)-furanones, 3-cyano-1,6-dihydro-4-methyl-2,6dioxy(2H)-pyridines, 1,3-indandiones and benzo (b) thieno-3 (2H)-ylidenepropanedinitrile-S,S-dioxide compounds.

3. The polyester of claim 1 wherein A is selected from the following formulae $=C(CN)CO_2R_1$, $=C(CN)CON(R_2)R_3$, $=C(CN)R_5$,

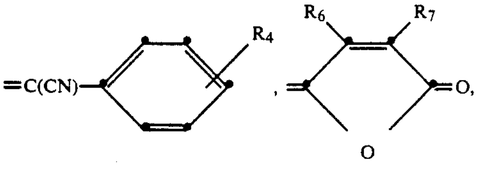

-continued

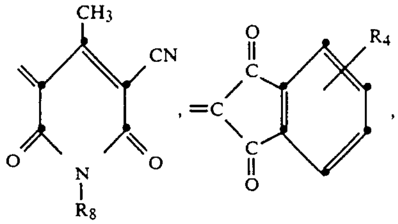

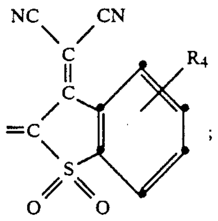

wherein $R_1$ is unsubstituted or substituted straight or branched chain alkyl of 1–8 carbons, unsubstituted or substituted cycloalkyl, unsubstituted or substituted aryl or alkenyl; wherein $R_2$ and $R_3$ are independently selected from hydrogen or one of the groups listed for $R_1$; $R_4$ is selected from hydrogen, lower alkyl, lower alkoxy, halogen, carboxy or lower alkoxycarbonyl; $R_5$ is an aromatic heterocyclic radical selected from unsubstituted or substituted 2-benzothiazolyl, 2-benzoxazolyl, 2-benzimidazolyl, pyridyl, pyrimidinyl, 1,3,4-thiadiazol-2-yl, 1,2,4-thiadiazol-5-yl, 1,3,4-oxadiazol-2-yl, 2-thiazolyl, thienyl or furanyl; $R_6$ is selected from unsubstituted or substituted alkyl and aryl; $R_7$ is cyano, $SO_2R_1$, $CO_2R_1$, $CON(R_2)R_3$, phenyl, substituted phenyl, or $R_5$; and $R_8$ is hydrogen or one of the groups represented by $R_1$.

4. The polyester composition of claim 3 wherein $R_1$ is lower alkyl, $R_4$ is carboxy or carboxylate ester, $R_5$ is 5-carboxy (or ester)-2-benzothiazolyl, 5-carboxy (or ester)-2-benzoxazolyl and 5-carboxy (or carboxy)-2-benzimidazolyl; $R_6$ is selected from phenyl or phenyl substituted with lower alkyl, lower alkoxy or halogen; $R_7$ is selected from $CO_2R_1$, wherein $R_1$ is lower alkyl; and $R_8$ is alkyl substituted with hydroxy or acyloxy and phenyl or benzyl substituted with carboxy or lower alkoxycarbonyl.

5. The polyester composition of claim 1 wherein the active methylene residues B and $B_1$ are independently selected from the following formulae:

$=C(CN)CO_2—$, $=C(CN)CON(R_2)—$,

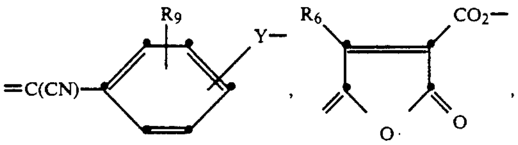

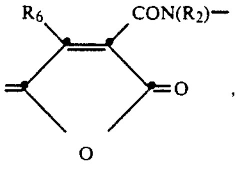

-continued

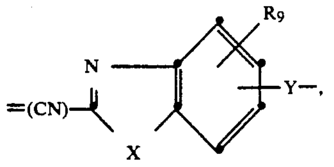

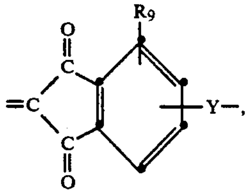

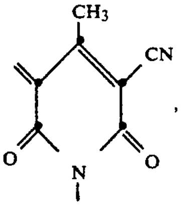

, or

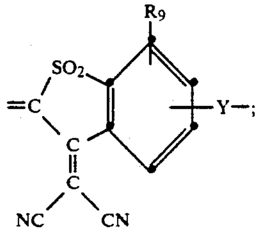

wherein $R_9$ is selected from hydrogen, lower alkyl, lower alkoxy, or halogen; X is selected from —b 0—, —S— or —$N(R_2)$—; Y is a divalent residue selected from —0—, —S—, $SO_2$, —$OCO_2$—, —$CO_2$—, —$CON(R_2)$—, —$SO_2N(R_2)$— or —$N(SO_2R_1)$—; wherein $R_1$, is unsubstituted or substituted straight or branched chain alkyl of 1-8 carbon atoms, unsubstituted or substituted aryl or alkenyl, $R_2$ and $R_3$ are independently selected from hydrogen or one of the groups listed for $R_1$; and $R_6$ is selected from unsubstituted or substituted alkyl or aryl.

6. The polyester composition of claim 1 wherein =B—L—$B_1$=in combination is =C(CN)—$C_6H_4$—C(CN)=.

7. The polyester composition of claim 1 wherein B and $B_1$ are selected from the following formulae:

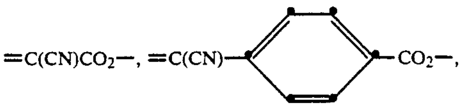

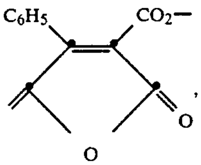

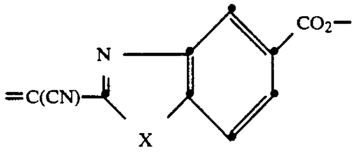

and

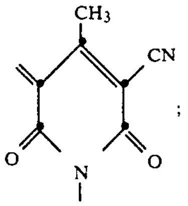

;

wherein X is selected from —O—, —S—, or —$N(R_2)$—, wherein $R_2$ is hydrogen, unsubstituted or substituted straight or branched chain alkyl of 1-8 carbons, unsubstituted or substituted cycloalkyl, unsubstituted or substituted aryl or alkenyl, and L is selected from alkylene, alkylene-O-alkylene, phenylene, alkylene-cycloalkylene-alkylene or alkylene-arylene-alkylene.

8. An amorphous color concentrate comprising an amorphous polyester having copolymerized therein or reacted therewith at least about 5.0 weight percent of a residue of Formulae (I) and/or (II):

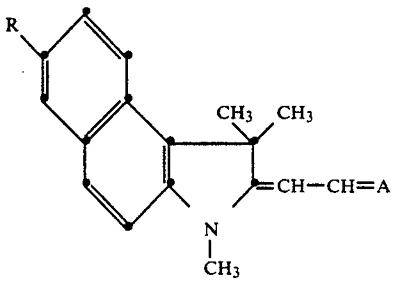

(I)

and/or

-continued

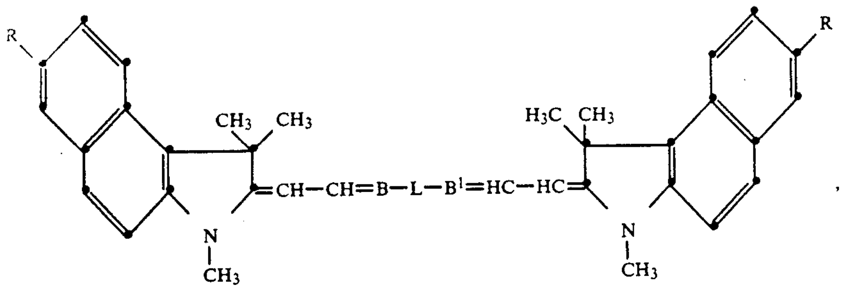

(II)

wherein R is carboxy, $C_1$-$C_8$ optionally substituted alkoxycarbonyl, $C_3$-$C_7$ cycloalkoxycarbonyl, $C_3$-$C_8$ alkenyloxycarbonyl, or aryloxycarbonyl;

A is a divalent residue of an active methylene component;

B and $B^1$ are the trivalent residues of an active methylene compound; and

L is a $C_1$-$C_{20}$ divalent organic residue.

9. The color concentrate of claim 8 wherein A represents the divalent residue of an active methylene compound selected from α-cyanoacetic acid esters, α-cyanoacetamides, α-arylacetonitriles, 2(5H)-furanones; 3-cyano-1,6-dihydro-4-methyl-2,6dioxy(2H)-pyridines, 1,3-indandiones and benzo(b) thieno-3 (2H)-ylidenepropanedinitrile-S,S-dioxide compounds.

10. The color concentrate of claim 8 wherein A is selected from the following formulae $=C(CN)CO_2R_1$, $=C(CN)CON(R_2)R_3$, $=C(CN)R_5$,

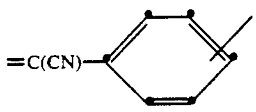

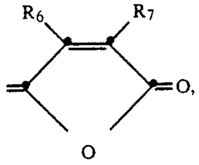

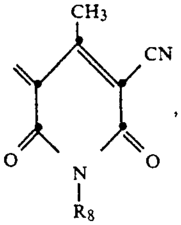

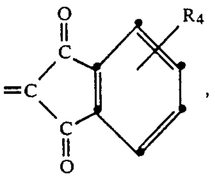

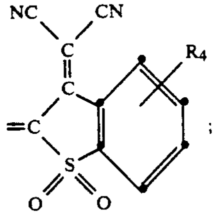

wherein $R_1$ is unsubstituted or substituted straight or branched chain alkyl of 1-8 carbons, unsubstituted or substituted cycloalkyl, unsubstituted or substituted aryl or alkenyl; wherein $R_2$ and $R_3$ are independently selected from hydrogen or one of the groups listed for $R_1$; $R_4$ is selected from hydrogen, lower alkyl, lower alkoxy, halogen, carboxy or lower alkoxycarbonyl; $R_5$ is an aromatic heterocyclic radical selected from unsubstituted or substituted 2-benzothiazolyl, 2benzoxazolyl, 2-benzimidazolyl, pyridyl, pyrimidinyl, 1,3,4-thiadiazol-2-yl, 1,2,4-thiadiazol-5-yl, 1,3,4-oxadiazol-2-yl, 2-thiazolyl, thienyl or furanyl; $R_6$ is selected from unsubstituted or substituted alkyl and aryl; $R_7$ is cyano, $SO_2R_1$, $CO_2R_1$, $CON(R_2)R_3$, phenyl substituted phenyl, or $R_5$; and $R_8$ is hydrogen or one of the groups listed for $R_1$.

11. The color concentrate of claim 10 wherein $R_1$ is lower alkyl, $R_4$ is carboxy or carboxylate ester, $R_5$ is 5-carboxy (or ester)-2-benzothiazolyl, 5-carboxy (or ester)-2-benzoxazolyl and 5-carboxy (or carboxy)-2-benzimidazolyl; $R_6$ is selected from phenyl or phenyl substituted with lower alkyl, lower alkoxy or halogen; $R_7$ is selected from $CO_2R_1$, wherein $R_1$ is lower alkyl; and $R_8$ is alkyl substituted with hydroxy or acyloxy and phenyl or benzyl substituted with carboxy or lower alkoxycarbonyl.

12. The color concentrate of claim 8 wherein the active methylene residues B and $B_1$ are independently selected from the following formulae:

$=C(CN)CO_2-$, $=C(CN)CON(R_2)-$,

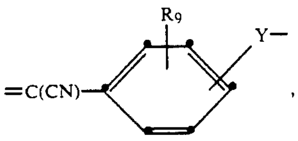

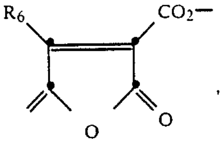

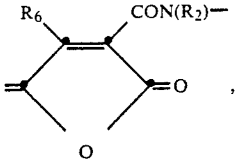

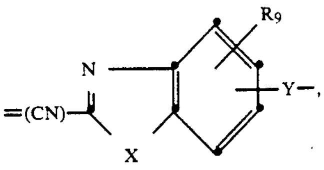

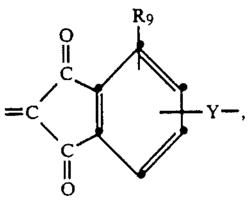

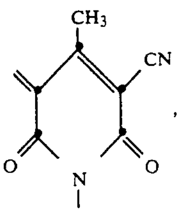

, or

-continued

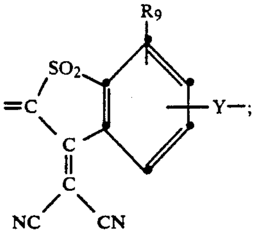

wherein $R_9$ is selected from hydrogen, lower alkyl, lower alkoxy, or halogen; X is selected from —O—, —S—or —$N(R_2)$—; Y is a divalent linking group selected from —O—, —S—, $SO_2$, —$OCO_2$—, —$CO_2$—, —$CON(R_2)$—, —$SO_2N(R_2)$— or —$N(SO_2R_1)$—; wherein $R_1$, is unsubstituted or substituted straight or branched chain alkyl of 1-8 carbon atoms, unsubstituted or substituted aryl or alkenyl, $R_2$ and $R_3$ are independently selected from hydrogen or one of the groups listed for $R_1$; $R_6$ is selected from unsubstituted or substituted alkyl or aryl.

13. The color concentrate of claim 8 wherein =B—L—$B_1$=in combination is =C(CN)—$C_6H_4$—C(CN)=.

14. The color concentrate of claim 8 wherein B and $B_1$ are selected from the following formulae:

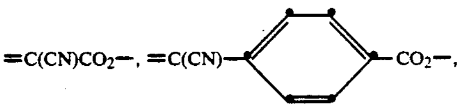

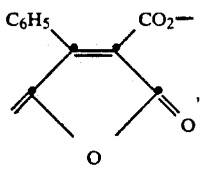

-continued

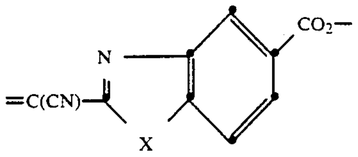

and

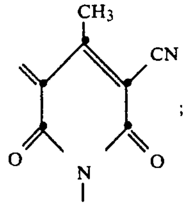

wherein X is selected from —O—, —S—, or $N(R_2)$—, wherein $R_2$ is hydrogen, unsubstituted or substituted straight or branched chain alkyl of 1-8 carbons, unsubstituted or substituted cycloalkyl, unsubstituted or substituted aryl or alkenyl, and L is selected from alkylene, alkylene-O-alkylene, phenylene, alkylene-cycloalkylene-alkylene or alkylene-arylene-alkylene.

15. A partially-crystalline polyester color concentrate comprising a partially-crystalline polyester having copolymerized therein or reacted therewith at least about 5.0 weight percent of a residue of Formulae (I) and/or (II):

(I)

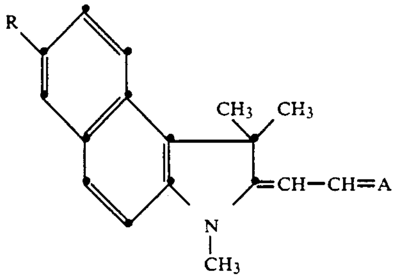

and/or (II)

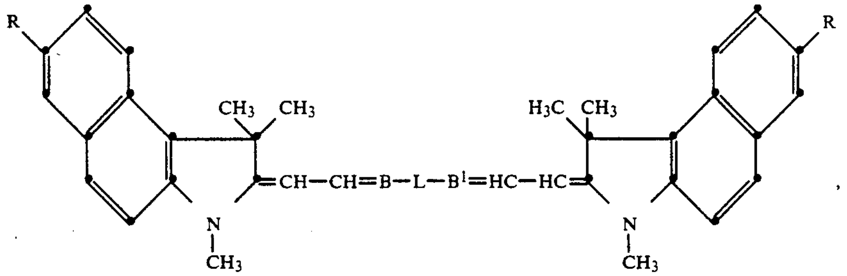

wherein R is carboxy, $C_1$-$C_8$ optionally substituted alkoxycarbonyl, $C_3$-$C_7$ cycloalkoxycarbonyl, $C_3$-$C_8$ alkenyloxycarbonyl, or aryloxycarbonyl;

A is a divalent residue of an active methylene component;

B and $B^1$ are the trivalent residues of an active methylene compound; and

L is a $C_1$-$C_{20}$ divalent organic residue.

16. The color concentrate of claim 15 wherein A represents the divalent residue of an active methylene compound selected from α-cyanoacetic acid esters, α-cyanoacetamides, α-arylacetonitriles, 2(5H)-furanones; 3-cyano-1,6-dihydro-4-methyl-2,6dioxy(2H)-pyridines, 1,3-indandiones and benzo(b) thieno-3 (2H)-ylidenepropanedinitrile-S,S-dioxide compounds.

17. The color concentrate of claim 15 wherein A is selected from the following formulae $=C(CN)CO_2R_1$, $=C(CN)CON(R_2)R_3$, $=C(CN)R_5$,

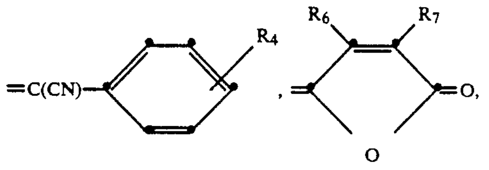

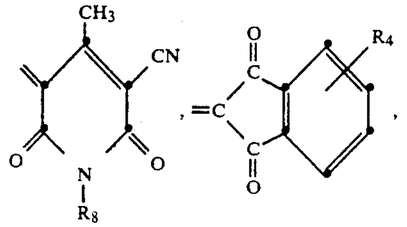

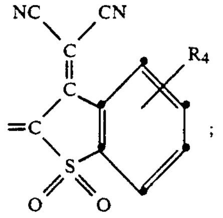

wherein $R_1$ is unsubstituted or substituted straight or branched chain alkyl of 1-8 carbons, unsubstituted or substituted cycloalkyl, unsubstituted or substituted aryl or alkenyl; wherein $R_2$ and $R_3$ are independently selected from hydrogen or one of the groups listed for $R_1$; $R_4$ is selected from hydrogen, lower alkyl, lower alkoxy, halogen, carboxy or lower alkoxycarbonyl; $R_5$ is an aromatic heterocyclic radical selected from unsubstituted or substituted 2-benzothiazolyl, 2-benzoxazolyl, 2-benzimidazolyl, pyridyl, pyrimidinyl, 1,3,4-thiadiazol-2-yl, 1,2,4-thiadiazol-5-yl, 1,3,4-oxadiazol-2 yl, 2-thiazolyl, thienyl or furanyl; $R_6$ is selected from unsubstituted or substituted alkyl and aryl; $R_7$ is cyano, $SO_2R_1$, $CO_2R_1$, $CON(R_2)R_3$, phenyl, substituted phenyl, or $R_5$; and $R_8$ is hydrogen or one of the groups represented by $R_1$.

18. The color concentrate of claim 15 wherein $R_1$ is lower alkyl, $R_4$ is carboxy or carboxylate ester, $R_5$ is 5-carboxy (or ester)-2-benzothiazolyl, 5-carboxy (or ester)-2-benzoxazolyl and 5-carboxy (or carboxy)-2-benzimidazolyl; $R_6$ is selected from phenyl or phenyl substituted with lower alkyl, lower alkoxy or halogen; $R_7$ is selected from $CO_2R_1$, wherein $R_1$ *l is lower alkyl; and* $R_8$ is alkyl substituted with hydroxy or acyloxy and phenyl or benzyl substituted with carboxy or lower alkoxycarbonyl.

19. The color concentrate of claim 15 wherein the active methylene residues B and $B_1$ are independently selected from the following formulae:

$=C(CN)CO_2—$, $=C(CN)CON(R_2)—$,

-continued

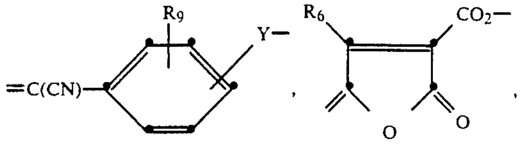

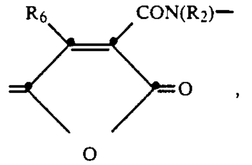

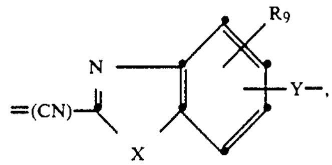

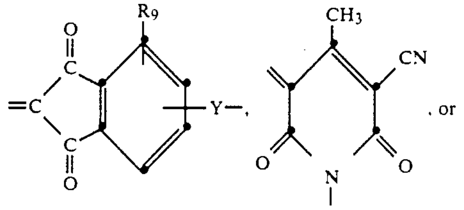

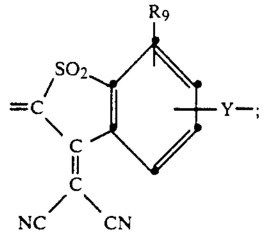

wherein $R_9$ is selected from hydrogen, lower alkyl, lower alkoxy, or halogen; X is selected from —O—, —S— or —N(R₂)—; Y is a divalent linking group selected from —O—, —S—, $SO_2$, $—OCO_2—$, $—CO_2—$, $—CON(R_2)—$, $—SO_2N(R_2)—$ or $—N(SO2R_1)—$; wherein $R_1$ , is unsubstituted or substituted straight or branched chain alkyl of 1-8 carbon atoms, unsubstituted or substituted aryl or alkenyl, $R_2$ and $R_3$ are independently selected from hydrogen or one of the groups listed for $R_1$; $R_6$ is selected from unsubstituted or substituted alkyl or aryl.

20. The color concentrate of claim 15 wherein =B—L—$B_1$=in combination is $=C(CN)—C_6H_4—C(CN)=$.

21. The color concentrate of claim 15 wherein B and $B_1$ are selected from the following formulae:

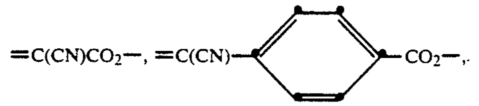

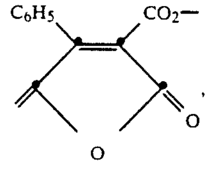

-continued

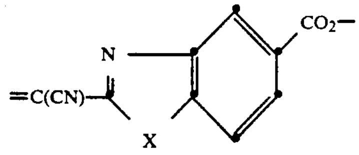

and

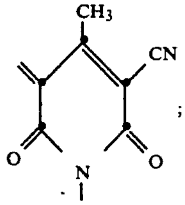

;

wherein X is selected from —O—, —S—, or $N(R_2)$—, wherein $R_2$ is hydrogen, unsubstituted or substituted straight or branched chain alkyl of 1-8 carbons, unsubstituted or substituted cycloalkyl, unsubstituted or substituted aryl or alkenyl, and L is selected from alkylene, alkylene-O-alkylene, phenylene, alkylene-cycloalkylene-alkylene or alkylene-arylene-alkylene.

22. A colored semicrystalline powder having an average particle diameter of less than about 50 microns comprising a normally-amorphous polyester which has been modified by dissolution-crystallization-precipitation to impart crystallinity thereto, having copolymerized therein or reacted therewith at least about 5.0 weight percent of a residue of Formulae (I) and/or (II):

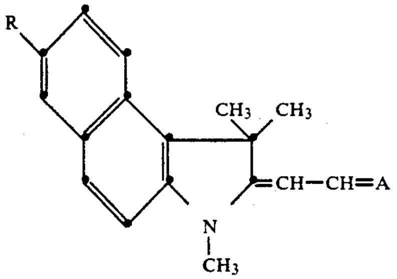

(I)

and/or

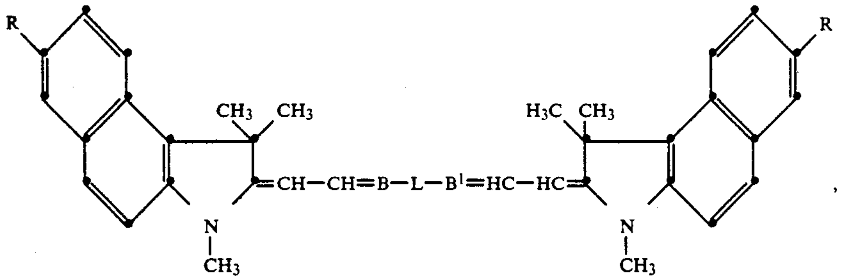

(II)

wherein R is carboxy, $C_1$-$C_8$ optionally substituted alkoxycarbonyl, $C_3$-$C_7$ cycloalkoxycarbonyl, $C_3$-$C_8$ alkenyloxycarbonyl, or aryloxycarbonyl;

A is a divalent residue of an active methylene component;

B and $B^1$ are the trivalent residues of an active methylene compound; and

L is a $C_1$-$C_{20}$ divalent organic residue.

23. The colored semicrystalline powder of claim 22 wherein A represents the divalent residue of an active methylene compound selected from α-cyanoacetic acid esters, α-cyanoacetamides, α-arylacetonitriles, 2(5H)-furanones; 3-cyano-1,6-dihydro-4-methyl-2, 6-dioxy(2H)-pyridines, 1,3-indandiones and benzo(b) thieno-3 (2H)-ylidenepropanedinitrile-S,S-dioxide compounds.

24. The colored semicrystalline powder of claim 22 wherein A is selected from the following formulae $=C(CN)CO_2R_1$, $=C(CN)CON(R_2)R_3$, $=C(CN)R_5$,

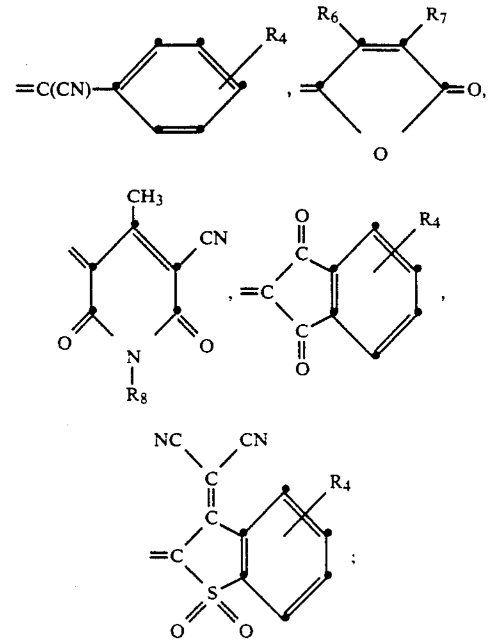

;

wherein $R_1$ is unsubstituted or substituted straight or branched chain alkyl of 1-8 carbons, unsubstituted or substituted cycloalkyl, unsubstituted or substituted aryl or alkenyl; wherein $R_2$ and $R_3$ are independently selected from hydrogen or one of the groups listed for $R_1$; $R_4$ is selected from hydrogen, lower alkyl, lower alkoxy, halogen, carboxy or lower alkoxycarbonyl; $R_5$ is an aromatic heterocyclic radical selected from unsubstituted or substituted 2-benzothiazolyl, 2benzoxazolyl, 2-benzimidazolyl, pyridyl, pyrimidinyl, 1,3,4-thiadiazol-2-yl, 1,2,4-thiadiazol-5-yl, 1,3,4-oxadiazol-2-yl, 2-thiazolyl, thienyl or furanyl; $R_6$ is selected from unsubstituted or substituted alkyl and aryl; $R_7$ is cyano, $SO_2R_1$, $CO_2R_1$, $CON(R_2)R_3$, phenyl, substituted phenyl, or $R_5$; and $R_8$ is hydrogen or one of the groups listed for $R_1$.

25. The colored semicrystalline powder of claim 24 wherein $R_1$ is lower alkyl, $R_4$ is carboxy or carboxylate ester, $R_5$ is 5-carboxy (or ester)-2-benzothiazolyl, and 5-carboxy (or ester)-2-benzoxazolyl and 5-carboxy (or carboxy)-2-benzimidazolyl; $R_6$ is selected from phenyl or phenyl substituted with lower alkyl, lower alkoxy or halogen; $R_7$ is selected from $CO_2R_1$, wherein $R_1$ is lower alkyl; and $R_8$ is alkyl substituted with hydroxy or acyloxy and phenyl or benzyl substituted with carboxy or lower alkoxycarbonyl.

26. The colored semicrystalline powder of claim 22 wherein the active methylene residues B and $B_1$ are independently selected from the following formulae:

$=C(CN)CO_2—$, $=C(CN)CON(R_2)—$,

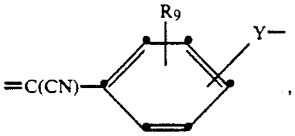

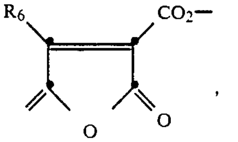

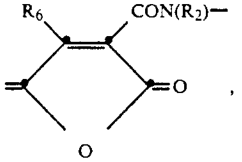

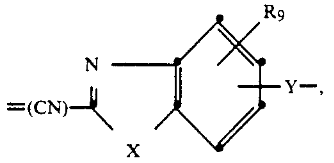

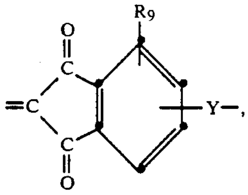

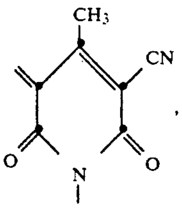

, or

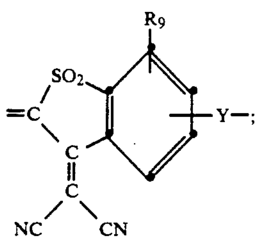

wherein $R_9$ is selected from hydrogen, lower alkyl, lower alkoxy, or halogen; X is selected from —O—, —S— or $N(R_2)$—; Y is a divalent linking group selected from —O—, —S—, $SO_2$, —OCO2, $—CO_2—$, $—CON(R_2)—$, $—SO_2N(R_2)—$ or $—N(SO_2R_1)$ ; wherein $R_1$, is unsubstituted or substituted straight or branched chain alkyl of 1-8 carbon atoms, unsubstituted or substituted aryl or alkenyl, $R_2$ and $R_3$ are independently selected from hydrogen or one of the groups listed for $R_1$; $R_6$ is selected from unsubstituted or substituted alkyl or aryl.

27. The colored semicrystalline powder of claim 22 wherein $=B—L—B_1=$ in combination is $=C(CN)—C_6H_4—C(CN)=$.

28. The colored semicrystalline powder of claim 22 wherein B and $B_1$ are selected from the following formulae:

$=C(CN)CO_2—$,

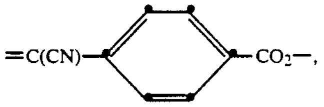

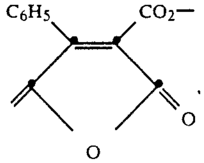

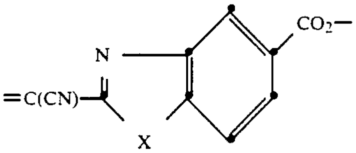

and

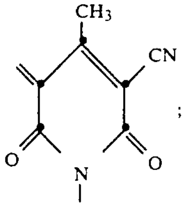

wherein X is selected from —O—, —S—, or $—N(R_2)—$, wherein $R_2$ is hydrogen, unsubstituted or substituted straight or branched chain alkyl of 1-8 carbons, unsubstituted or substituted cycloalkyl, unsubstituted or substituted aryl or alkenyl, and L is selected from alkylene, alkylene-O-alkylene, phenylene, alkylene-cycloalkylene-alkylene or alkylene-arylene-alkylene.

29. A formed article comprising the polyester composition of claim 1.

30. A compound having Formula (I)

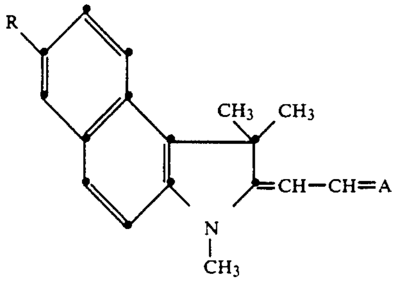

(I)

wherein R is carboxy or $C_1$-$C_8$ alkoxycarbonyl; and

A is a divalent residue of an active methylene component.

31. The compound of claim 30 wherein A is selected from the formulae $=C(CN)CO_2R_1$, $=C(CN)CON(R_2)R_3$, $=C(CN)R_5$,

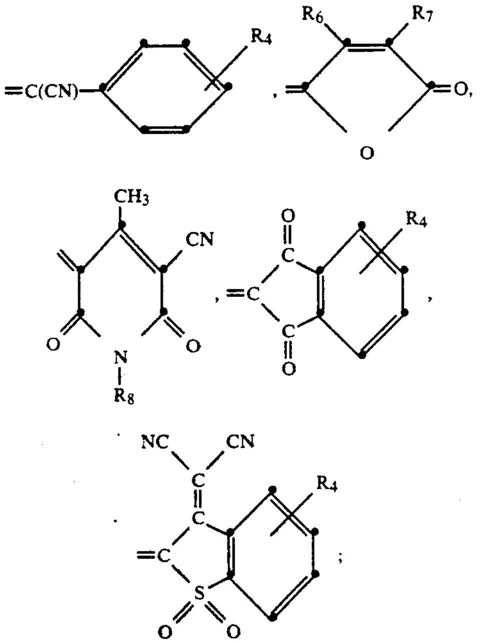

wherein $R_1$ is unsubstituted or substituted straight or branched chain alkyl of 1–8 carbons, unsubstituted or substituted cycloalkyl, unsubstituted or substituted aryl or alkenyl; wherein $R_2$ and $R_3$ are independently selected from hydrogen or one of the groups listed for $R_1$; $R_4$ is selected from hydrogen, lower alkyl, lower alkoxy, halogen, carboxy or lower alkoxycarbonyl; $R_5$ is an aromatic heterocyclic radical selected from unsubstituted or substituted 2-benzothiazolyl, 2-benzoxazolyl, 2-benzimidazolyl, pyridyl, pyrimidinyl, 1,3,4-thiadiazol.2.yl, 1,2,4 -thiadiazol-5-yl, 1,3,4-oxadiazol-2-yl, 2-thiazolyl, thienyl or furanyl; $R_6$ is selected from unsubstituted or substituted alkyl and aryl; $R_7$ is cyano, $SO_2R_1$, $CO_2R_1$/, $CON(R_2)R_3$, phenyl, substituted phenyl, or $R_5$; and $R_8$ is hydrogen or one of the groups listed for $R_1$.

32. The compound of claim 30 wherein $R_1$ is lower alkyl, $R_4$ is carboxy or carboxylate ester, $R_5$ is 5-carboxy or ester)-2-benzothiazolyl, 5-carboxy (or ester)2-benzoxazolyl and 5-carboxy (or carboxy)-2-benzimidazolyl; $R_6$ is selected from phenyl or phenyl substituted with lower alkyl, lower alkoxy or halogen; $R_7$ is selected from $CO_2R_1$, wherein $R_1$ is lower alkyl; and $R_8$ is alkyl substituted with hydroxy or acyloxy and phenyl or benzyl substituted with carboxy or lower alkoxycarbonyl.

33. A compound having the Formula (II)

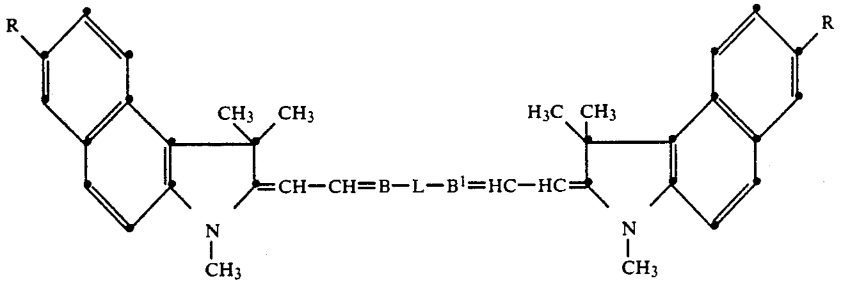

(II)

wherein R is carboxy, $C_1$–$C_8$ optionally substituted alkoxycarbonyl, $C_3$–$C_7$ cycloalkoxycarbonyl, $C_3$–$C_8$ alkenyloxycarbonyl, or aryloxycarbonyl;

B and $B^1$ are the trivalent residues of an active methylene compound; and

L is a $C_1$–$C_{20}$ divalent organic residue.

34. The compound of claim 33 wherein the active methylene residues B and $B_1$ are independently selected from the following formulae:

$=C(CN)CO_2$—, $=C(CN)CON(R_2)$—,

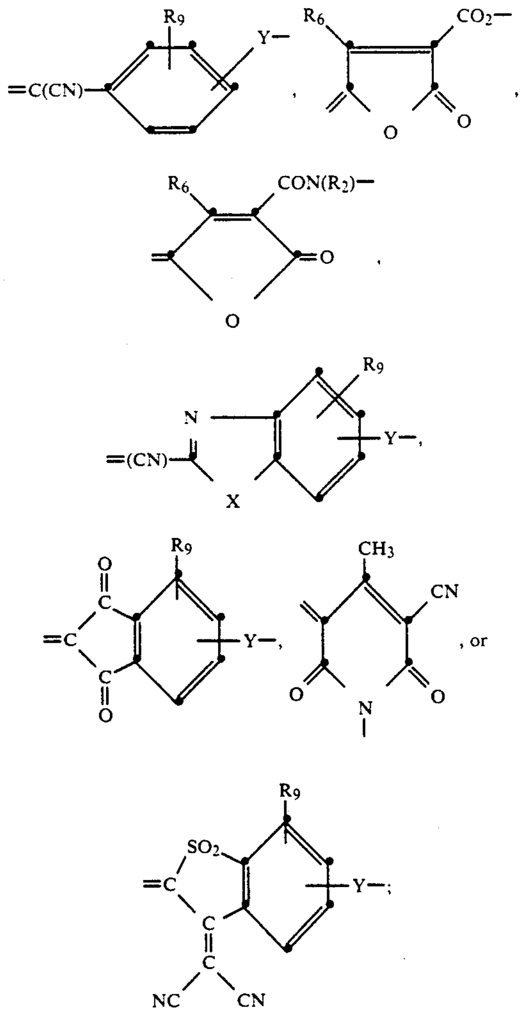

wherein $R_9$ is selected from hydrogen, lower alkyl, lower alkoxy, or halogen; X is selected from —O—, —S— or —N($R_2$)—; Y is a divalent linking group selected from —O—, —S—, $SO_2$, —$OCO_2$—, —$CO_2$, —CON($R_2$)—, —$SO_2N(R_2)$— or —N($SO_2R_1$)—; wherein $R_1$, is unsubstituted or substituted straight or branched chain alkyl of 1-8 carbon atoms, unsubstituted or substituted aryl or alkenyl, $R_2$ and $R_3$ are independently selected from hydrogen or one of the groups listed for $R_1$; $R_6$ is selected from unsubstituted or substituted alkyl or aryl.

35. The compound of claim 33 wherein =B—L—$B_1$= in combination is =C(CN) $C_6H_4$—C(CN)=.

36. The compound of claim 33 wherein B and $B_1$ are selected from the following formulae:

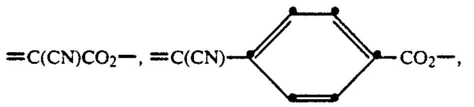

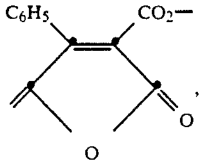

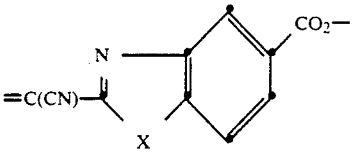

and

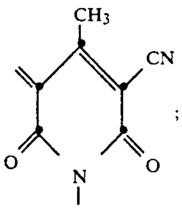

;

wherein X is selected from —O—, —S—, or —N($R_2$)—, wherein $R_2$ is hydrogen, unsubstituted or substituted straight or branched chain alkyl of 1-8 carbons, unsubstituted or substituted cycloalkyl, unsubstituted or substituted aryl or alkenyl, and L is selected from alkylene, alkylene-O-alkylene, phenylene, alkylene-cycloalkylene-alkylene or alkylene-arylene-alkylene.

37. A compound having the formula

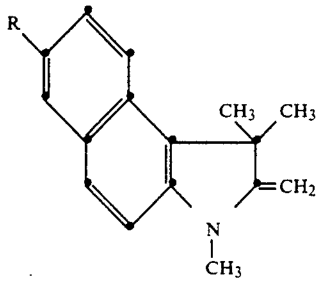

wherein R is carboxy, $C_1$-$C_8$ optionally substituted alkoxycarbonyl, $C_3$-$C_7$ cycloalkoxycarbonyl, $C_3$-$C_8$ alkenyloxycarbonyl, or aryloxycarbonyl.

38. The compound of claim 37, wherein R is carboxy or $C_1$-$C_8$ alkoxycarbonyl.

39. A compound having the formula

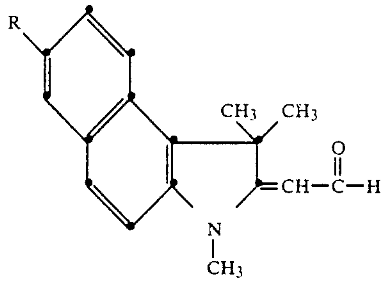

wherein R is carboxy, $C_1$-$C_8$ optionally substituted alkoxycarbonyl, $C_3$-$C_7$ cycloalkoxycarbonyl, $C_3$-$C_8$ alkenyloxycarbonyl, or aryloxycarbonyl.

40. The compound of claim 39, wherein R is carboxy or $C_1$-$C_8$ alkoxycarbonyl.

* * * * *